(12) United States Patent
Merino Vazquez et al.

(10) Patent No.: US 11,889,328 B2
(45) Date of Patent: Jan. 30, 2024

(54) AUDIT PROCESS FOR THE MONITORING OF EVENTS

(71) Applicant: Telefonaktiebolaget LM Ericsson (publ), Stockholm (SE)

(72) Inventors: Emiliano Merino Vazquez, Madrid (ES); Jesus Angel De Gregorio Rodriguez, Madrid (ES); Raquel Izquierdo Martin, Madrid (ES); Carlos Daniel Sanchez-Biezma Sanchez, Madrid (ES); Beatriz Maroto Gil, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 244 days.

(21) Appl. No.: 17/274,501

(22) PCT Filed: Oct. 15, 2018

(86) PCT No.: PCT/EP2018/078072
§ 371 (c)(1),
(2) Date: Mar. 9, 2021

(87) PCT Pub. No.: WO2020/052790
PCT Pub. Date: Mar. 19, 2020

(65) Prior Publication Data
US 2021/0385672 A1    Dec. 9, 2021

(30) Foreign Application Priority Data

Sep. 14, 2018  (EP) ..................................... 18382661

(51) Int. Cl.
*H04W 24/04*    (2009.01)
*H04W 68/00*    (2009.01)

(52) U.S. Cl.
CPC ......... *H04W 24/04* (2013.01); *H04W 68/005* (2013.01)

(58) Field of Classification Search
CPC ........................... H04W 24/04; H04W 68/005
(Continued)

(56) References Cited

U.S. PATENT DOCUMENTS

2011/0310888 A1* 12/2011 Merino Vazquez ........................ H04L 65/1016
370/352
2013/0305340 A1* 11/2013 Wotring .............. H04L 63/1416
726/11
(Continued)

FOREIGN PATENT DOCUMENTS

CN    104349373 A    2/2015
CN    106982425 A    7/2017
(Continued)

OTHER PUBLICATIONS

3GPP, "3GPP TS 23.502 V16.7.1", 3rd Generation Partnership Project; Technical Specification Group Services and System Aspects; Procedures for the 5G System (5GS); Stage 2 (Release 16), Jan. 2021, 1-603.
(Continued)

*Primary Examiner* — Hermon Asres
(74) *Attorney, Agent, or Firm* — Murphy, Bilak & Homiller, PLLC

(57) ABSTRACT

The invention relates to a method for operating a tracking entity (100, 400) configured to track to which access and connectivity management entity (200) a mobile device (50) is connected in a mobile communications network, wherein an application server (60) is initiating a monitoring of an event occurring at the mobile device, the method comprising: —receiving a request to monitor the event at the mobile device (50), the request comprising an indication for an audit
(Continued)

for the monitoring of the event by which a validity of the monitoring of the event should be checked when the event has not been detected for an indicated period of time, —transmitting the received request for the event with the indication for the audit and the indicated period of time to the access and connectivity management entity (200) to which the mobile device is connected, —receiving a notification from the access and connectivity management entity (200) that the event has not been detected for the indicated period of time, —determining, in response to the received notification, based on information available in the tracking unit whether the monitoring of the event should be continued or not.

28 Claims, 15 Drawing Sheets

(58) Field of Classification Search
USPC .......................................................... 709/224
See application file for complete search history.

(56) References Cited

U.S. PATENT DOCUMENTS

| 2016/0007138 | A1 | 1/2016 | Palanisamy et al. |
| 2017/0311304 | A1* | 10/2017 | Lu .................... H04N 21/4131 |

FOREIGN PATENT DOCUMENTS

| CN | 107534833 A | 1/2018 |
| CN | 107637101 A | 1/2018 |

OTHER PUBLICATIONS

3GPP, "3GPP TS 23.682 V14.8.0", 3rd Generation Partnership Project; Technical Specification Group Services and System Aspects; Architecture enhancements to facilitate communications with packet data networks and applications (Release 14), Jun. 2018, 1-108.

3GPP, "3GPP TS 23.682 V15.5.0", 3rd Generation Partnership Project; Technical Specification Group Services and System Aspects; Architecture enhancements to facilitate communications with packet data networks and applications (Release 15), Jun. 2018, 1-125.

3GPP, "3GPP TS 29.272 V15.4.0", 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15), Jun. 2018, 1-168.

3GPP, "3GPP TS 29.336 V15.3.0", 3rd Generation Partnership Project; Technical Specification Group Core Network and Terminals; Home Subscriber Server (HSS) diameter interfaces for interworking with packet data networks and applications (Release 15), Jun. 2018, 1-71.

3GPP, "3rd Generation Partnership Project; Technical Specification Group Services and System Aspects; Procedures for the 5G System; Stage 2 (Release 15)", 3GPP TS 23.502 V15.2.0, Jun. 2018, 1-308.

Ericsson, "Multiple instances in a configuration request command clarifications", 3GPP TSG CT WG4 Meeting #85bis, C4-185449, (was C4-185235), Sophia Antipolis, France, Jul. 9-13, 2018, 1-8.

Ericsson, "Supported Services AVP handling", 3GPP TSG CT WG4 Meeting #85bis, C4-185451, (was C4-185239), Sophia Antipolis, France, Jul. 9-13, 2018, 1-11.

Huawei, "Restart of SCEF", 3GPP TSG CT4 Meeting #72, C4-161472, Jeju, the republic of Korea, Feb. 15-19, 2016, 1-3.

* cited by examiner

US 11,889,328 B2

AUDIT PROCESS FOR THE MONITORING OF EVENTS

TECHNICAL FIELD

The present invention relates to a method for operating a tracking entity configured to track to which access and connectivity management entity a mobile device is connected in a mobile communications network. Furthermore, the corresponding tracking entity is provided. The invention additionally relates to a method for operating an access and connectivity management entity configured to monitor the access and connectivity of a mobile device to a mobile communications network, and to the corresponding access and connectivity management entity. Additionally, a method for operating an exposure entity configured to expose services provided by the mobile communications network is provided and the corresponding exposure entity itself. In addition a system comprising the tracking entity, the access and connectivity management entity and/or the exposure entity is provided, together a computer program comprising program code, and a carrier comprising the computer program.

BACKGROUND

Cellular Internet of Things (CIoT) is a technology which involves Machine-Type Communication devices (MTC device) so that a telecommunications operator may provide other parties/companies its network for different applications.

A clear example of such applications is the use of smart-metering readers, in which an MTC device can be placed in different locations and start sending and receiving data on a regular basis (e.g. electricity consumption reports, water-levels). This information requires that a given provider (e.g. electricity company) configures monitoring events on the different devices via a Service Capability Exposure Function (SCEF) for 4G devices and Network Exposure Function (NEF) for 5G devices.

The Exposure Function or exposure entity is the SCEF or NEF, depending on the type of access (4G or 5G) and is a functional entity which receives the configuration of different monitoring events (e.g. MTC device becomes reachable or any other event) initiated by an Application Server (AS) and via the HSS (Home Subscriber Server) towards the Mobility Management Entity (MME) in 4G Core, or via UDM (Unified Data Management) towards the Access Management Function (AMF) in 5G Core. The MME/AMF will monitor the events for the duration requested by the AS, or until a given number of reports (also requested by the AS) is reached. This is called in 3GPP TS 23.682 (4G) and TS 25.50223.502 (5G) "continuous monitoring" or "continuous reporting," and it may last months.

FIG. 1 shows a situation when the MME has lost connectivity to the other entities. In step S11, the application server configures the monitoring of an event in the exposure entity including the information which events should be monitored and including an expiration time until which the event should be monitored (e.g. with a message configure monitoring event, including information monitor-event=X, expiration-time=2019-01-01). In step S12, the exposure entity transmits a request to the subscriber database with the configuration data to monitor the desired event until the expiration date as indicated (Configuration-Information-Request, monitor-event=X, expiration-time=2019-01-01). In step S13, the subscriber database transmits a request to the MME, an insert data request including the information of the monitored event and the expiration time (Insert-Data-Request, monitor-event=X, expiration-time=2019-01-01). In step S14, the event is configured and the continuous monitoring and reporting is performed by the entities as indicated. In step S15, the MME detects the event for the MTC device and in step S16 the MME sends a report information request about the detected event to the SCEF (Report-Information-Request, event=X), wherein the request is confirmed in step S17 (Report-Information-Answer, ok). In steps S18 (Report, event-=X) and S19 (Ack, event-=X), the application server is informed, the latter acknowledging the report of step S18. As symbolized by step S20, the event may not occur for a certain period of time and this is detected by the MME, and the application server may determine in step S21 (Configure monitoring event, remove-event=X) that the monitoring of the event should be removed so that the SCEF is informed accordingly. In step S22 (Configuration-Information-Request, remove-event=X), the subscriber database is informed accordingly with the configuration information request to remove the event. In FIG. 1, it is assumed that the MME has a temporary connectivity problem so that the MME cannot receive and transmit data from other entities or to other entities. Thus a connectivity failure occurs in step S23 and in step S24 (Insert-Data-Request, remove-event=X) to S26 the request for the removal of the event is sent several times and after a certain time the request is discarded after several reattempts. In step S27, the monitoring of the event is removed at the HSS, the exposure function and the application server, however, the MME is still monitoring the event until the desired expiration time without releasing its internal resources.

Accordingly, as shown in FIG. 1, the problem in the situation of FIG. 1 is that one entity may still monitor the event while others have already stopped monitoring the event.

A similar situation is shown in FIG. 2, the SCEF loses all the monitoring event data which then makes the MME monitoring useless since even if the event occurs, the reporting will never reached the MTC application server since the application server was part of the data lost by the SCEF. Accordingly, in step S31 (Configure monitoring event, monitor-event=X, max-number-of-reports=Y), similar to step S21 a message is sent to the SCEF to configure the monitoring of the event the message including the event to be monitored at the maximum number of reports. This information is then provided to the subscriber database in step S32 (Configuration-Information-Request, monitor-event=X, max-number-of-reports=Y) and the other step S33 (Insert-Data-Request, monitor-event=X, max-number-of-reports=Y) and steps S34 to S39 correspond to steps S24 to S29.

Similar to FIG. 1, the event does not occur for a long time in step S40 and in step S41 the SCEF loses all its data, e.g. due to a restart including the identity of the application server which requested the reporting of the event. Accordingly, after step S42 even if the event does not occur, the MME will keep monitoring the identified event identified by the request of step S31, even though the SCEF is not able to send the reports about the events to the application server.

In FIG. 3 the situation discussed above in connection with FIG. 1 is disclosed in connection with a 5G network. In step S51 (Nnef_EventExposure_Subscribe, monitor-event=X, expiration-time=2019-01-01), the application server subscribes to an event of a defined type including the expiration time until which the event should be monitored. The subscriber message is transmitted in step S52 (Nudm_Event- Exposure_Subscribe, monitor-event=X, expiration-time=2019-01-01) to the UDM which forwards the message with the information as received to the AMF, S53 (Namf_EventExposure_Subscribe, monitor-event=X, expiration-time=2019-01-01). Similar to steps S14 to S16 the event is configured in S54 and the continuous monitoring is performed and when the AMF detects the event for the MTC device in S55 the network exposure function is informed accordingly in S56 (Namf_EventExposure_Notify, event=X) with a confirmation been transmitted in step S57 (Namf_EventExposure_NotifyResponse, ok). Additionally, the information is transmitted to the application server with a confirmation in steps S58 (NNef_EventExposure_Notify, event-=X) and S59 (Ack, event-=X).

In step S60 the event does not occur for a certain time and in step S61 (Nnef_EventExposure_Unsubscribe, event=X) the application server determines that it doesn't want to monitor the event anymore, wherein this information is transmitted to the UDM in step S62 (Nudm_EventExposure_Unsubscribe, event=X). In step S63, the AMF loses its connectivity so that in steps S64 to S66 the request to unsubscribe from the monitoring of the event is discarded after several reattempts. In step S67, the event is removed at the involved entities, but not at the AMF and when the connectivity is recovered at the AMF in step S68, the AMF will continue monitoring the event even though the other involved entities have already stopped monitoring the event.

FIG. 4 describes a situation similar for the situation explained in connection with FIG. 2, however, for a 5G network. Accordingly, the application server subscribes in S71 (Nnef_EventExposure_Subscribe, monitor-event=X, max-number-of-reports=Y) to the monitoring of the event with a maximum number of reports in the network exposure function, wherein the information is forwarded to the UDM and the AMF in steps S72 (Nudm_EventExposure_Subscribe, monitor-event=X, max-number-of-reports=Y) and S73 (Namf_EventExposure_Subscribe, monitor-event=X, max-number-of-reports=Y), respectively. Steps S74 to S75 correspond to steps S34 and S35. After the event is deleted in step S75, the information about the event is exchanged with the NEF in step S76 (Namf_EventExposure_Notify, event=X) and S77 (Namf_EventExposure_NotifyResponse, ok). Furthermore, the AS is informed in steps S78 (Nnef_EventExposure_Notify, event-=X) and S79 (Ack, event-=X). When the event does not occur for a certain time period in step S80 and when the metric exposure function loses its connectivity all data is lost in step S82 so that the AMF will keep monitoring the event even though the NEF is not able to send the report towards the application server.

As can be seen from the above discussion of FIGS. 1 to 4 a main drawback resides in the basic concept of the continuous monitoring over a longer period of time. From the beginning there is a continuous monitoring for events which do not occur very often and the MTC devices which may be stationary so that there is no change in the MME or AMF, any problem occurring in any of the nodes involved makes the information across the network inconsistent. This inconsistency may last days or months, and during such time the monitoring and resources associated to the monitoring are of no use and, what is more important, they cannot give room for new events if the resources such as the memory in the MME or AMF are exhausted due to a large number of hanging monitoring events.

In the situation shown in FIG. 1 the HSS or UDM could keep the event to reattempt the request towards the MME or AMF for the removal after a given time, but this solution is not practical when there is a large number of events to be temporarily stored in the subscriber database HSS/UDM. Furthermore, this would lead to a large signaling increase when reattempting all the events queued.

SUMMARY

Accordingly, a need exists to overcome the above mentioned problems and to provide a solution in which a consistent way of monitoring of events is obtained at the different entities involved.

This need is met by the features of the independent claims. Further aspects are described in the dependent claims.

According to a first aspect a method for operating a tracking entity configured to track to which access and connectivity management entity a mobile device is connected in a mobile communications network is provided, wherein an application server is initiating a monitoring of an event occurring at the mobile device. In the method a request is received at the tracking entity to monitory the event at the mobile device, wherein the request comprises an indication for an audit for the monitoring of the event by which a validity of the monitoring of the event should be checked when the event has not been detected for an indicated period of time. The tracking entity furthermore transmits the received request for the event with the indication for the audit and the indicated period of time to the access and connectivity management entity to which the mobile device is connected. Furthermore, it receives a notification from the access and connectivity management entity that the event has not been detected for indicated period of time. In response to the received notification it is determined based on information available in the tracking entity whether the monitoring of the event should be continued or not.

The audit helps to keep the monitoring of events consistent. When the notification is received from the access and connectivity management, a query may be received to check with the rest of the network entities involved if the monitoring should be continued on not.

The information upon which the tracking entity determines whether the monitoring should be continued on not can comprise information such as a unique identity of the device for which the event is monitored such as the IMSI (International Mobility Subscriber Identity) and the unique identifier of the event being monitored.

Furthermore, the corresponding tracking entity is provided comprising a memory and at least one processing unit, wherein the memory contains instructions executable by the at least one processing unit wherein the tracking entity is operative to work as discussed above or as discussed in further detail below.

As an alternative, a tracking entity is provided configured to track to which access and connectivity management entity a mobile device is connected in a mobile communications network, wherein the tracking entity comprises a first module configured to receive a request to monitor the event at the mobile device wherein the request comprises an indication for an audit for the monitoring of the event by which a validity of the monitoring of the event should be checked when the event has not occurred for an indicated period of time. The tracking entity comprises a second module configured to transmit the received request for the event with the indication for the audit and the indicated period of time to the access and connectivity management entity. A third module is configured to receive a notification from the access and connectivity management entity that the event has not been detected for the indicated period of time and a fourth module of the tracking entity is configured to determine, in response to the received notification, whether the monitoring of the event should be continued based on the information provided in the tracking entity.

The request received at the tracking entity comprises the indication for the audit which is also transmitted to the access and connectivity management entity. The latter then carries out the audit and informs the tracking entity accordingly if the event has not been detected for the indicated time range. The tracking entity can then determine whether the monitoring of the event should be continued or not.

According, to a further aspect a method for operating an access and connectivity management entity is provided configured to monitor the access and connectivity of the mobile device to the mobile communications network. The access and connectivity management entity receives a request to monitor the event at the mobile device initiated by an application server wherein the request comprises the indication for an audit for the monitoring of the event by which a validity of the monitoring of the event should be checked when the event has not been detected for an indicated period of time. The access and connectivity management entity then monitors whether the event occurs for the mobile device and if it is determined that the event has not occurred during the indicated period of time, the notification is transmitted to the tracking entity which is configured to track by which access and connectivity management entity the mobile device is connected to the mobile communications network. The notification can indicate that the event has not been detected during the indicated period of time and that the audit should be started in other entities of the mobile communications network involved in the monitoring of the event.

Furthermore, the corresponding access and connectivity management entity is provided comprising a memory and at least one processing unit, wherein the memory contains instructions executable by the at least one processing unit wherein the access and connectivity management entity is operative to work as discussed above or as discussed in further detail below.

As an alternative an access and connectivity management entity is provided comprising a first module configured to receive a request to monitor an event at the mobile device initiated by an application server wherein the request comprises the indication for an audit for the monitoring of the event by which the validity of the monitoring of the event should be checked when the event has not been detected for an indicated period of time. The access and connectivity management entity comprises a second module configured to monitor whether the event occurs at the mobile device and when the second module detects that the event has not occurred within the indicated period of time, a third module is configured to transmit a notification to the tracking entity wherein the notification indicates that the event has not been detected during the indicated period of time and that an audit should be started in the other entities of the mobile communications network involved in the monitoring of the event such as the tracking entity, the exposure entity or the application server.

Additionally, a method for operating an exposure entity configured to expose the services provided by or through the mobile communications network is provided. The method comprises the steps of receiving a request from an application server to monitor an event at a mobile device connected to the mobile communications network. Furthermore, the monitoring of the event is configured in the mobile communications network wherein the configuration comprises configuring an audit for the monitoring of the event by which a validity of the monitoring of the event should be checked when the event has not been detected for an indicated period of time. Furthermore, a request is transmitted to monitor the event to the tracking entity which is configured to track to which access and connectivity management entity the mobile device is connected to the mobile communications network. The request comprises the indication for the audit and the indicated period of time.

Additionally, the exposure entity is provided comprising the memory and at least one processing unit wherein memory contains instructions executable by the at least one processing unit, wherein the exposure entity is operative to work as discussed above or as discussed in further detail below.

As an alternative, an exposure entity is provided configured to expose services provided by the mobile communications network wherein the exposure entity comprises a first module configured to receive the request from the application server to monitor an event. A second module is provided configured to configure the monitoring of the event in the network wherein the audit for the monitoring of the event is configured. A third module of the exposure entity is configured to transmit the request to monitor the event to a tracking entity wherein the request comprises the indication for the audit and the indicated period of time.

Furthermore, a system comprising at least two elements from the group of elements comprising the tracking entity, the access and connectivity management entity and the exposure entity is provided.

Furthermore, a computer program comprising program code to be executed by the at least one processing unit of the tracking entity, of the access and connectivity management entity or of the exposure entity is provided wherein execution of the program code causes the at least one processing unit to execute a method as discussed above for as discussed in further detail below.

Additionally, a carrier comprising the computer program is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above mentioned aspects and embodiments described below may be combined with each other in other embodiments unless explicitly mentioned otherwise.

BRIEF DESCRIPTION OF DRAWINGS

The foregoing and additional features and effects of the application will become apparent from the following detailed description when read in conjunction with the accompanying drawings in which like reference numerals refer to like elements.

DETAILED DESCRIPTION OF DRAWINGS

Figure 1:
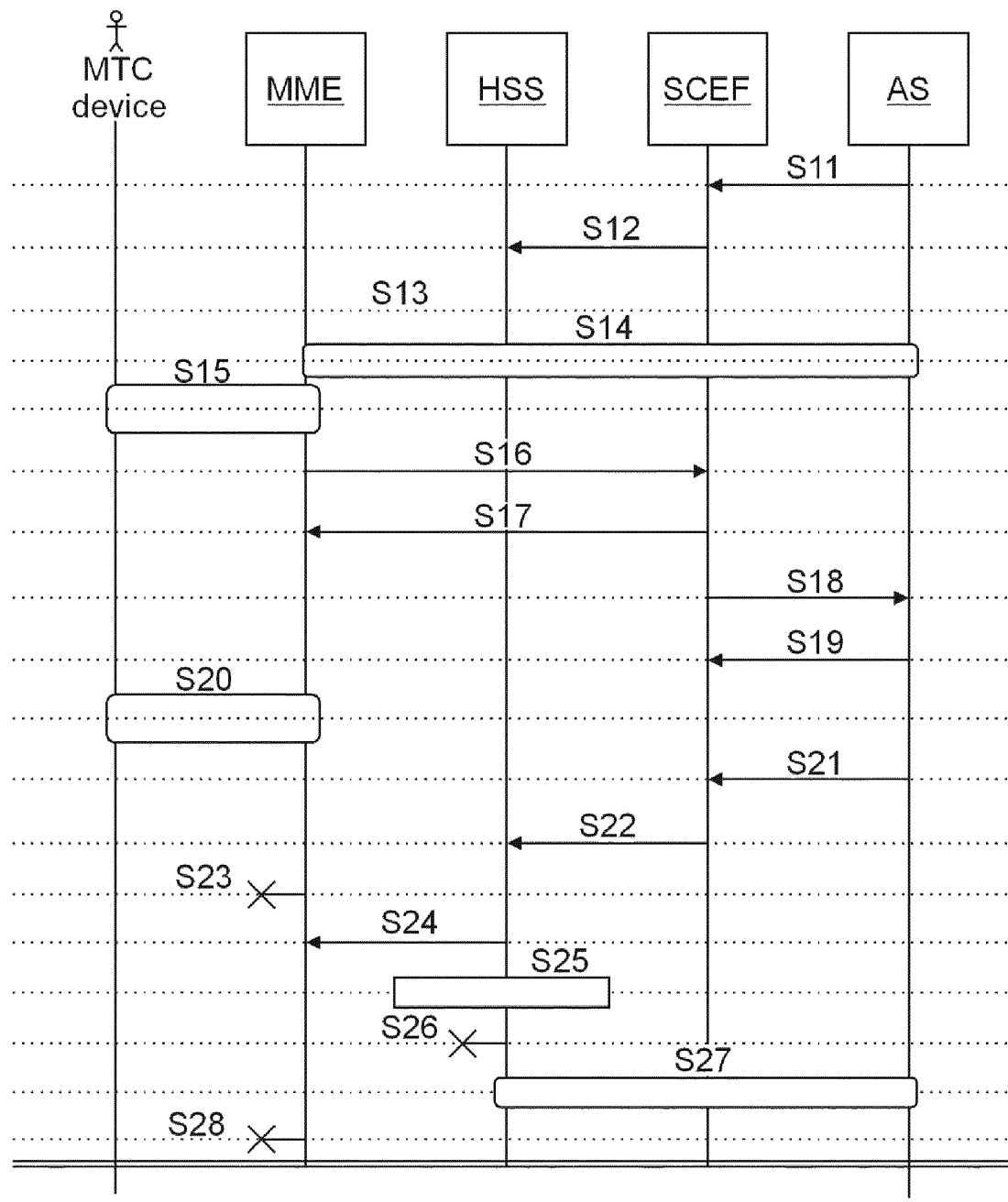
FIG. 1 shows a situation of the entities involved in a monitoring of an event in a 4G network when an MME connectivity problem occurs in the solution known in the art.

In the following, embodiments of the invention will be described in detail with reference to the accompanying drawings. It should be understood, that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented by hardware, software, firmware, or a combination thereof.

With the context of the present application the term MTC device, mobile entity or user equipment, UE refers to a device for instance used by a person or which is associated with non-humans like animals, plants or machines. It may be a telephone type of device, for example a telephone or a session initiating protocol or voice over IP phone, cellular telephone, mobile station, cordless phone, or personal digital assistant type of device like laptop, notebook, notepad, tablet equipped with a wireless data communication. The UE may be equipped with a subscriber identity module, SIM or entities such as the international mobile subscriber identity, IMSI, TMSI (the Temporary Mobile Subscriber Identity) or the globally unique temporary identity, GUTI, associated with the user using the UE. The presence of the SIM with the UE customizes the UE uniquely with a subscription of the user.

For the sake of clarity it is to be noted that there is a difference but a tight connection between a user and a subscriber. The user gets access to the network by acquiring a subscription to the network by that becomes a subscriber within the network. The mobile communications network then recognizes the subscriber and uses the associated subscription to identify related subscription data. A user can be the actual user of the UE and that the user may also be the owner of the subscription, but the user and the owner of the subscription may also be different.

In the following, the invention is described in connection with an MTC device. However, it should be understood that the invention is applicable to all kinds of mobile devices or user equipment as elaborated above.

As will be discussed below, a mechanism is provided which ensures the consistency among all the functional entities and release resources whenever an event is stale or not valid any longer. Accordingly the root cause that neither the interface between the MME/MMF and HSS/UDM and SCEF/NEF offers a mechanism to solve the problem is overcome.

A mechanism is introduced to audit events, especially long-lasting events which have not involved any e.g. traffic activity for an indicated time. As will be discussed below, the mechanism can be proactive, meaning that, when configuring an event, the HSS or UDM corresponding to a tracking entity configured to track to which access and connectivity management entity the mobile device is connected to will request the access and connectivity management entity to audit the event in case it is dormant for an indicated maximum time. The mechanism as described below, can also be implemented in a reactive way in which the tracking entity such as the HSS/UDM can immediately request an audit so that the tracking entity audits all events which are dormant for a given time.

Figure 5:
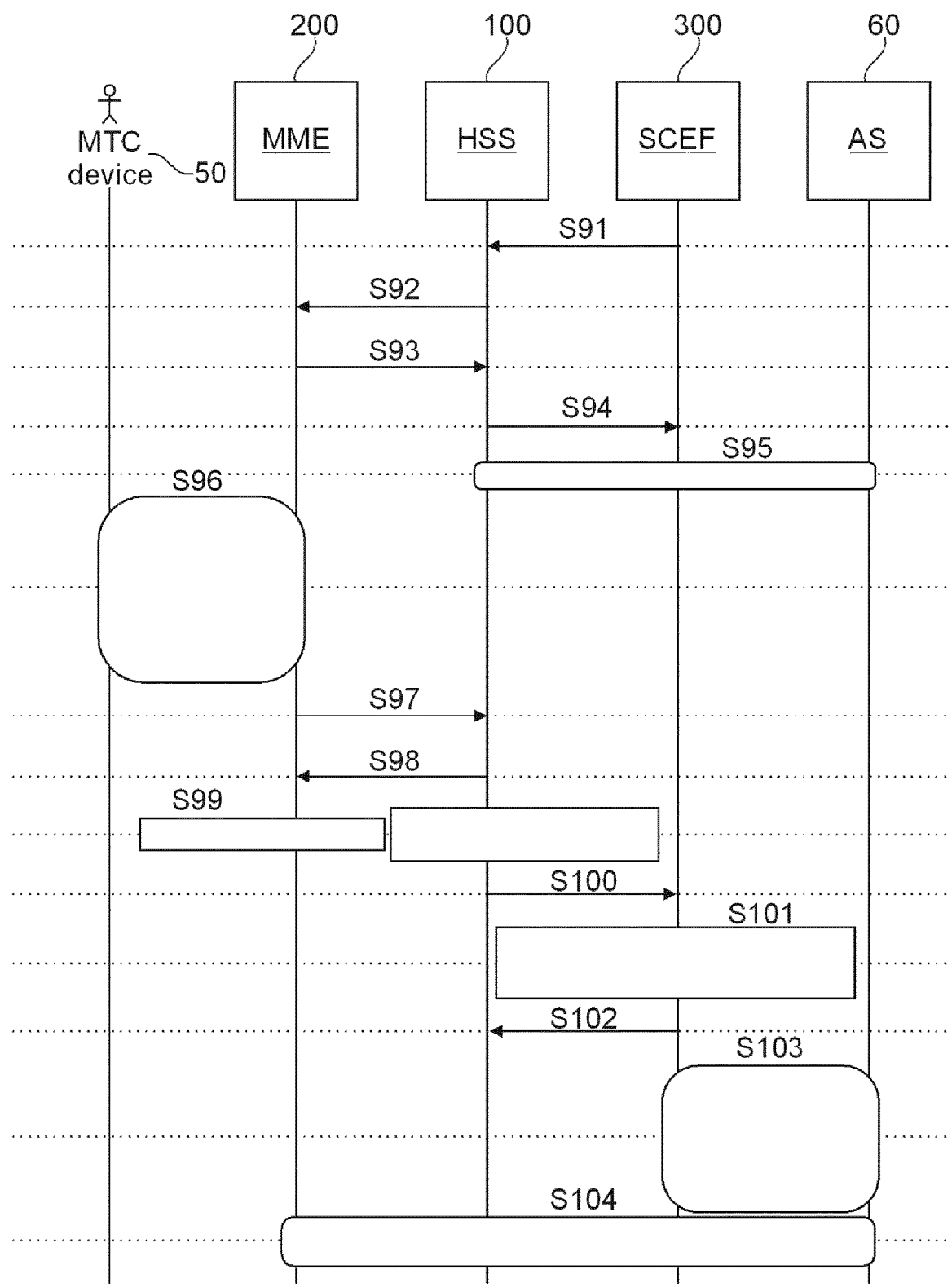
FIG. 5 shows a schematic message exchange between the involved entities in a situation in which the problems of the prior art shown in FIGS. 1 to 4 are overcome with an audit mechanism in a 4G network.

In the following, the solution is shown for a faulty network in FIG. 5. As in connection with FIG. 1 an event is configured by the application server not shown in this Figure. In step S91 (Configuration-Information-Request, monitor-event=X, expiration-time=2019-01-01, suggested-audit-time=24 hours) the exposure entity, here the SCEF 300, configures the event in the network using a configuration information request including the monitored to be event, the expiration time for the monitoring and an audit time, meaning an indicated period of time after which the audit mechanism should start when the event has not occurred for the indicated time period. The time period can be several hours, several days, e.g. 24 hours, 48 hours, 1 week, etc.

In step S92 (Insert-Data-Request, monitor-event=X, expiration=2019-01-01, suggested-audit-time=24 hours) the tracking entity which is configured to track to which access and connectivity management entity 200 the mobile device 50 is connected to, sends the configuration request with the requested audit time to the access and connectivity management entity, MME 200. In step S93 (Insert-Data-Answer, event-configured, accepted-audit-time=24 hours) the MME accepts the request and indicates that the audit time requested was successfully initiated. In step S94 (Configuration-Information-Answer, event-configured, accepted-audit-time=24 hours) the response is returned by the subscriber data base, the tracking entity 100, including the accepted audit time.

In step S95 the event is removed as discussed above in connection with FIG. 1 in steps S21 to S28. Accordingly, an event is removed during an IP-connectivity failure of the MME which is not aware of the fact that the monitoring of the event should have been removed. When the connectivity is restored, in step S96, the MME still has the event active since it is not aware of the removal of the event by the HSS 100 or the SCEF. Since no activity is detected for the indicated period of time, such as 24 hours, the MME audits the event. In step S97 (Notification-Request, event-X, audit-request=status_inquiry), the MME sends a notification request indicating that the indicated type of event is active, requesting to check the status in the other network elements such as the subscriber database or the exposure entity. In step S98, the HSS 100 does not find the event so it responds to the MME with the status that the event has been removed (Notification-Request, event-X, audit-result=removed), so that the MME is aware of the fact that the event is stale or not valid. In step S99, the MME locally removes the event in the MME. In the same time the HSS 100 informs the SCEF 300 that the specified event has been removed due to an audit, indicating that the requested type of event is not consistent across all network elements. In step S100 (Report-Information-Request, event=X, audit-request=remove), the HSS 100 sends a reporting information request towards the SCEF 300 to remove the requested type of event if it exists in the SCEF. The removal is send expressively indicating that it is due to an inconsistency detected during an audit. In step S101, the SCEF checks whether the event audited exists. If this is the case, it is removed, otherwise the SCEF simply confirms the removal in step S102 (Report-Information-Answer, event=X, audit-result=removed). In step S103, if the event was removed in the SCEF, the application server is informed, that the event is no longer monitored. The application server can initiate a new monitoring if the event is still needed by the application. In step S104, the monitoring of the event is stopped in the involved entities such as the MME, the HSS and the SCEF and the application server, wherein the resources are released in these entities, which were needed for monitoring of the event. Thus no inconsistency between the entities involved exists due to the audit mechanism.

Figure 2:
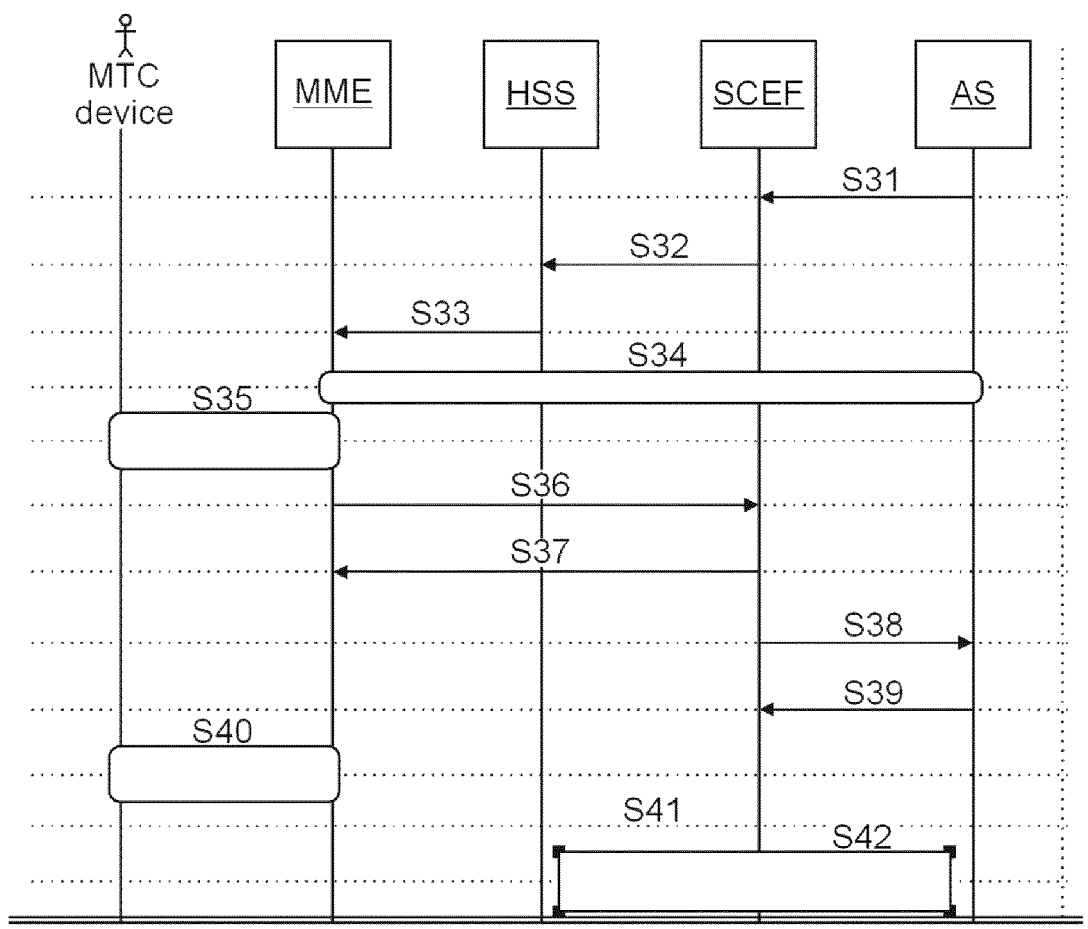
FIG. 2 shows the situation at the involved entities for the monitoring of an event when an exposure function failure occurs in a system as known in the art.
Figure 6:
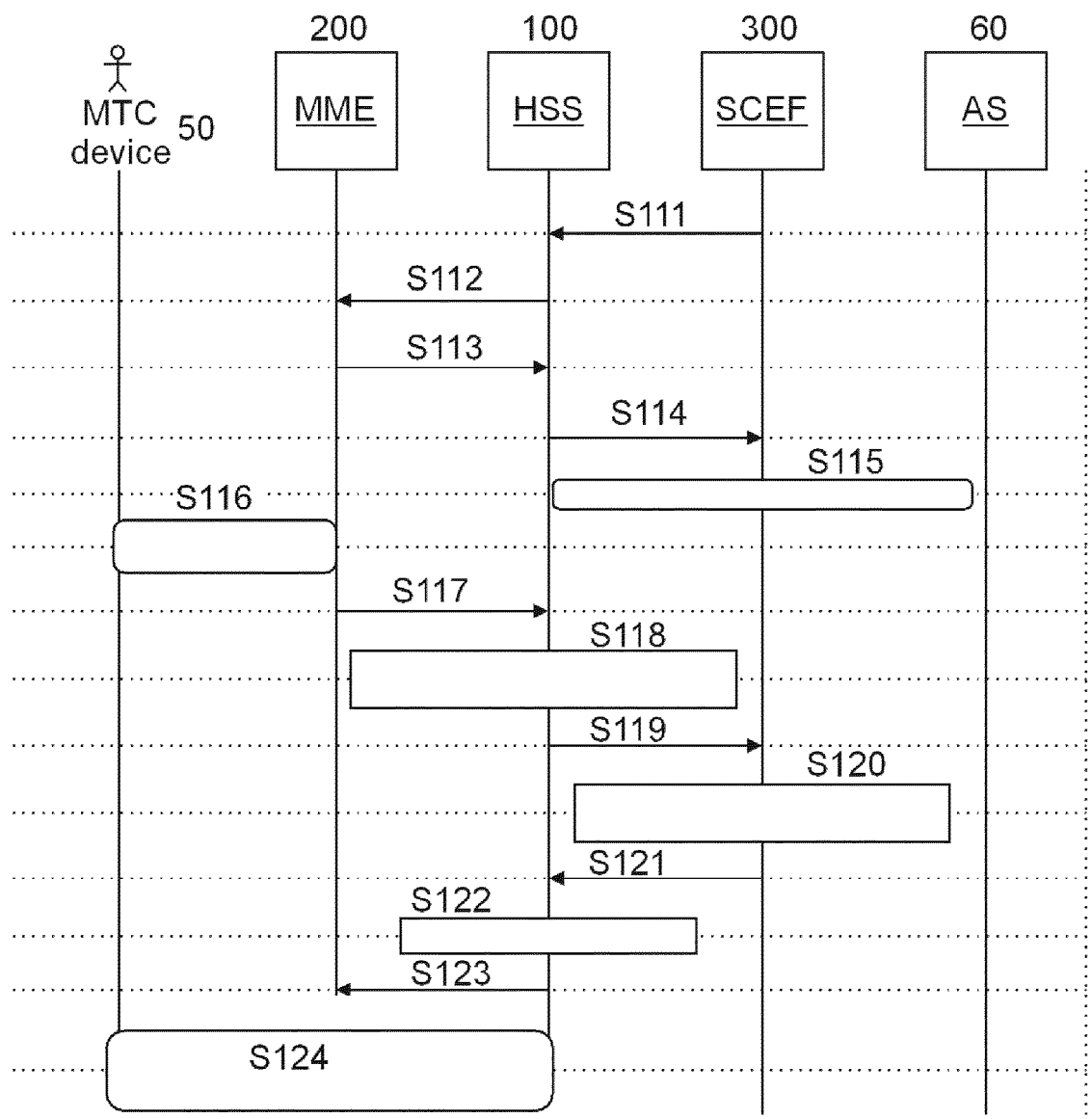
FIG. 6 shows a situation similar to the situation shown in FIGS. 2 and 4 for a 4G network in which the problems of FIGS. 2 and 4 are overcome with the audit mechanism.

FIG. 6 shows the situation with the audit mechanism when the SCEF 300 lost all data. In step S111 (Configuration-Information-Request, monitor-event=X, expiration-time=2019-01-01, suggested-audit-time=24 hours), the request for the configuration of the monitoring is sent from the SCEF 300 to the HSS 100 including the information about the monitored event, the expiration time and the suggested audit time. In step S112 (Insert-Data-Request, monitor-event=X, expiration-time=2019-01-01, suggested-audit-time=24 hours), the request is sent to the MME including the suggested audit time, wherein the reception is confirmed by the MME in step S113 (Insert-Data-Answer, event-configured, accepted-audit-time=24 hours). In step S114 (Configuration-Information-Answer, event-configured, accepted-audit-time=24 hours), the configuration with the audit time is confirmed to the SCEF. In step S115, the SCEF fails as discussed above in connection with FIG. 2 in steps S41 and S42. In step S116, it is detected that the event does not occur for the indicated audit time so that in step S117 (Notification-Request, event-X, audit-request=status_inquiry) the MME 200 informs the HSS accordingly requesting the status of the monitoring. In step S118, the event to be monitored is found in the HSS and the HSS audits the event in the SCEF so that in step S119 (Report-Information-Answer, event-X, audit-result=removed) a request is sent to the SCEF 300 comprising a status inquiry whether the monitoring of the event should be continued. Since the SCEF has lost all data as discussed above, it does not find the event in step S120. In step S121 (Report-Information-Answer, event-X, audit-result=removed), it informs the HSS 100 indicating that the event is no longer valid and should be removed. In step S122, the event is removed at the HSS 100 and in step S123 (Notification-Answer, event-X, audit-result=removed) an answer is sent in response to the request of step S117 that the event should be removed. In step S124, the monitoring of the event is removed in the mobile device, the MME and the HSS so that the network elements are consistent and the resources are released in the MME 200 and the HSS 100.

Figure 7:
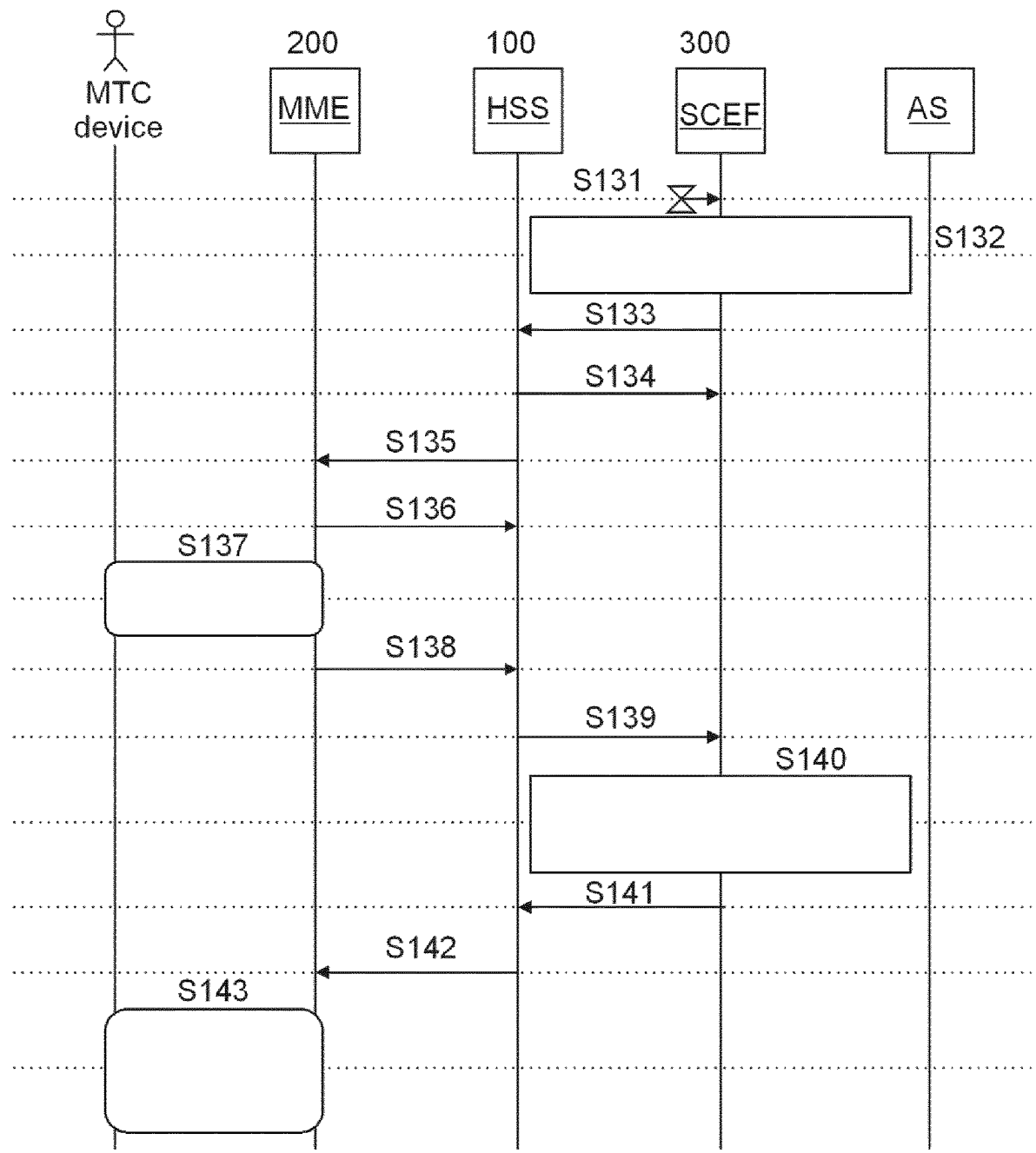
FIG. 7 shows a schematic message exchange between the entities involved in which it is determined to audit all events.

FIG. 7 shows a situation in which an audit of the complete network should be carried out. By way of example, after a failure in the SCEF an operator of the network may want to perform an audit in the network. To do so, it sends in step S131 an order to the SCEF to check whether there are events that have not been active for the defined period of time, such as 24 hours or more. In step S132, the SCEF checks the events with no activity in the indicated period of time such as 24 hours after the recovery. In step S133 (Configuration-Information-Request, audit-request=status_inquiry_ALL_events, dormant_duration=24 hours), the SCEF 300 sends a configuration request to trigger an audit in the MME for all events dormant for more than the indicated period of time. In step S134 (Configuration-Information-Answer, audit-result=status_inquiry_started), the HSS transmits a response indicating that auditing has been started. In step S135 (Insert-Data-Request, audit-request=status_inquiry_ALL_events, dormant_duration=24 hours), the HSS 100 sends a request to all MMEs so that they start auditing the events with no traffic activity for the indicated period of time. Each MME also indicates that the auditing has started in step S136 (Insert-Data-Answer, audit-result=status_inquiry_started). In the embodiment shown in FIG. 7, one MME of the plurality of MMEs checks all the events dormant for more than 24 hours and in step S138 (Notification-Request, event-X, audit-request=status_inquiry) the HSS 100 is informed accordingly when no traffic has been detected for the monitoring of an event. In step S139 (Report-Information-Request, event-X, audit-request=status_inquiry), a request is transmitted to the SCEF 300 requesting a status inquiry. If the event is found in step S140 in the SCEF, it replies with a successful answer. Otherwise, if the event does not exist in the SCEF it informs the HSS 100 that the event should be removed. This information is transmitted in step S141 (Report-Information-Answer, event=X, audit-result=removed), wherein the information is forwarded in step S142 (Notification- Answer, audit-result=removed) to the MME. In step S143, the monitoring for the indicated event is ended and the resources are released.

Figure 3:
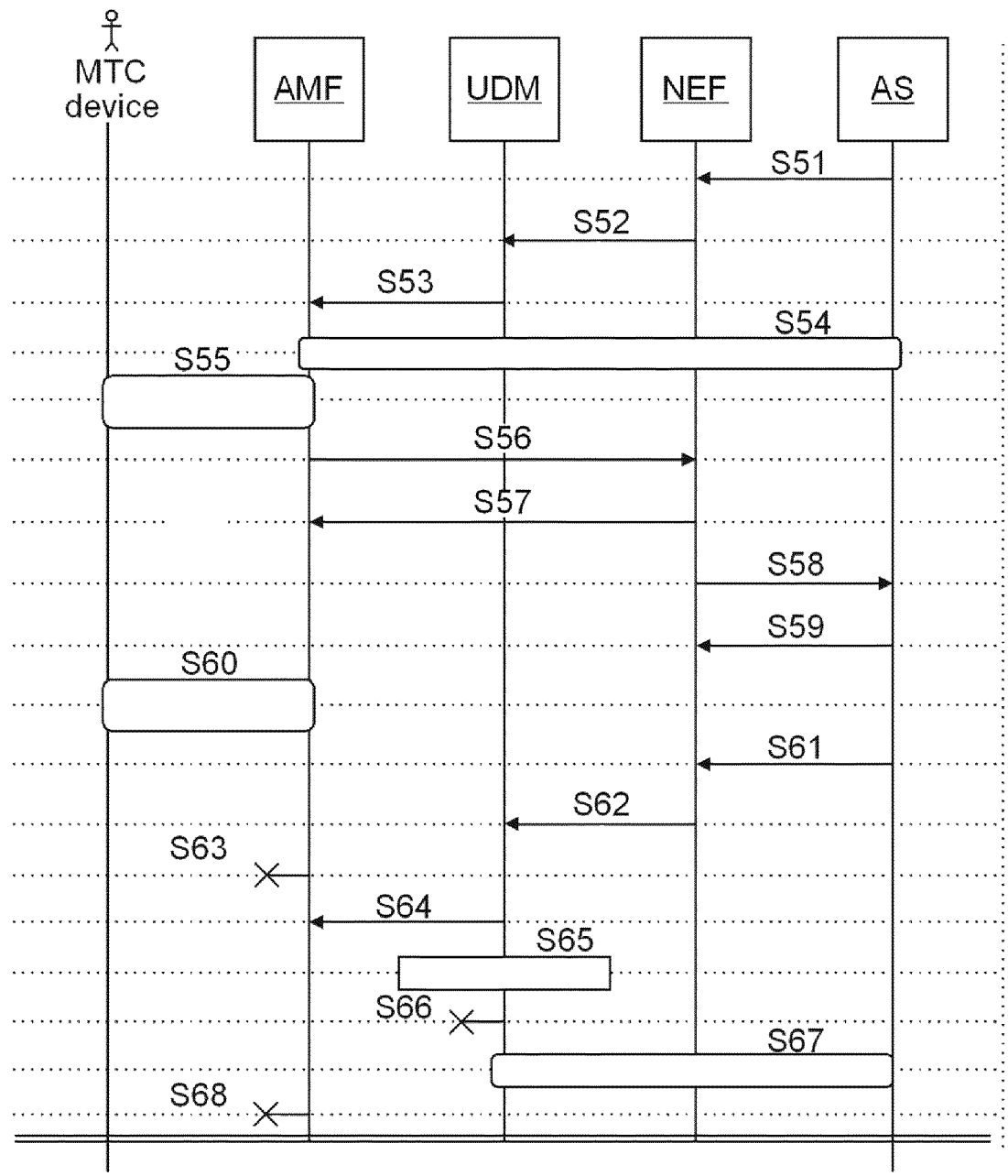
FIG. 3 shows a situation similar to FIG. 1 concerning the monitoring of an event for a 5G network.
Figure 8:
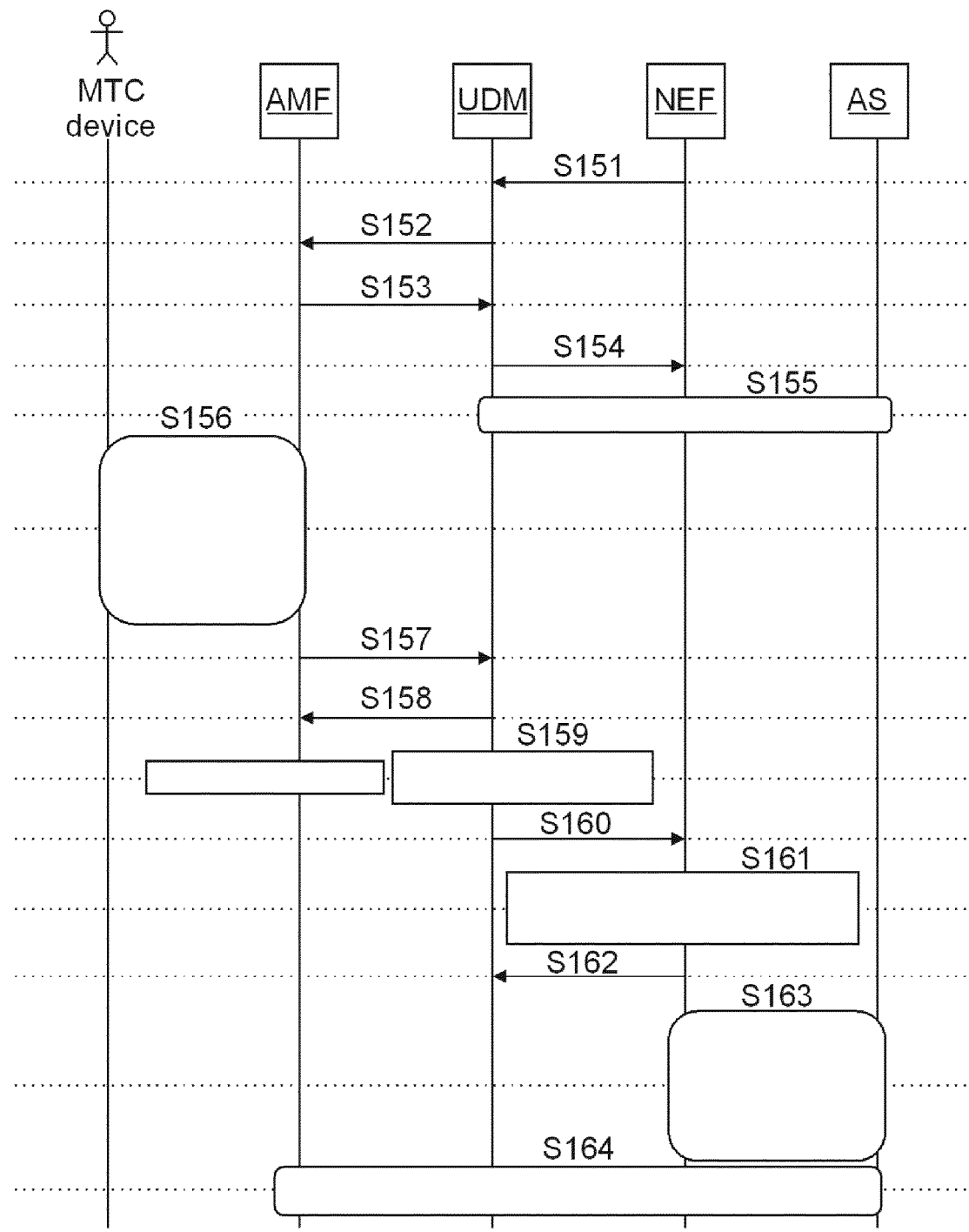
FIG. 8 shows a schematic message exchange between the entities involved in a 5G network for a situation as discussed in connection with FIG. 5.

In FIG. 8, the solution is shown for the problem discussed above in connection with FIG. 3 in which the AMF has a connectivity problem. In step S151 (Nudm_EventExposure_Audit, monitor-event=X, expiration-time=2019-01-01, suggested-audit-time=24 hours), the exposure entity subscribes to the monitoring of the event in the UDM, the message in step S151 including the monitored event, the expiration time and the suggested audit time, thus, the indicated period of time. In steps S152 (Namf_EventExposure_Audit, monitor-event=X, expiration-time=2019-01-01, suggested-audit-time=24 hours) and S153 (Namf_EventExposure_AuditResponse, event-configured, accepted-audit-time=24 hours), the information about the audit is exchanged between the UDM and the AMF and in step S154 (Numd_EventExposure_AuditResponse, event-configured, accepted-audit-time=24 hours) the response is transmitted in response to step S151 including that the audit has been accepted. In step S155, the event is removed as discussed above in connection with FIG. 3, steps S61 to S68, however, in view of the connectivity problem of the AMF, that continues the monitoring and as the event has not occurred for the defined period of time the audit is started in the AMF in step S156 so a status enquiry for the monitoring of the event is sent to the UDM in step S157 (Nudm_EventExposure_Audit, event-X, audit-request=status_inquiry) with the response in step S158 (Nudm_EventExposure_AuditResponse, event-X, audit-result=removed) that the monitoring of the event has been removed. In step S159, the monitoring of the event is removed in the AMF and at the same time the network exposure function or entry is informed about the fact that the event has been removed due to the audit. In step S160 (Nnef_EventExposure_Audit, event=X, audit-request=remove), the request is send to the exposure entity to remove the monitoring of the event. In step S161, it is checked in the exposure entity, whether the monitoring of the event is active or not. If the event exists in the NEF it is removed at this point. Otherwise, the NEF simply confirms the removal in step S162 (Nnef_EventExposure_AuditResponse, event=X, audit-result=removed). In step S163, if the event has been removed in the previous steps, the exposure entity notifies the application server which should initiate a new request to monitor the event if needed. In step S164, the monitoring of the event is ended and the resources are released in the AMF, the UDM, the NEF and the application server.

Figure 4:
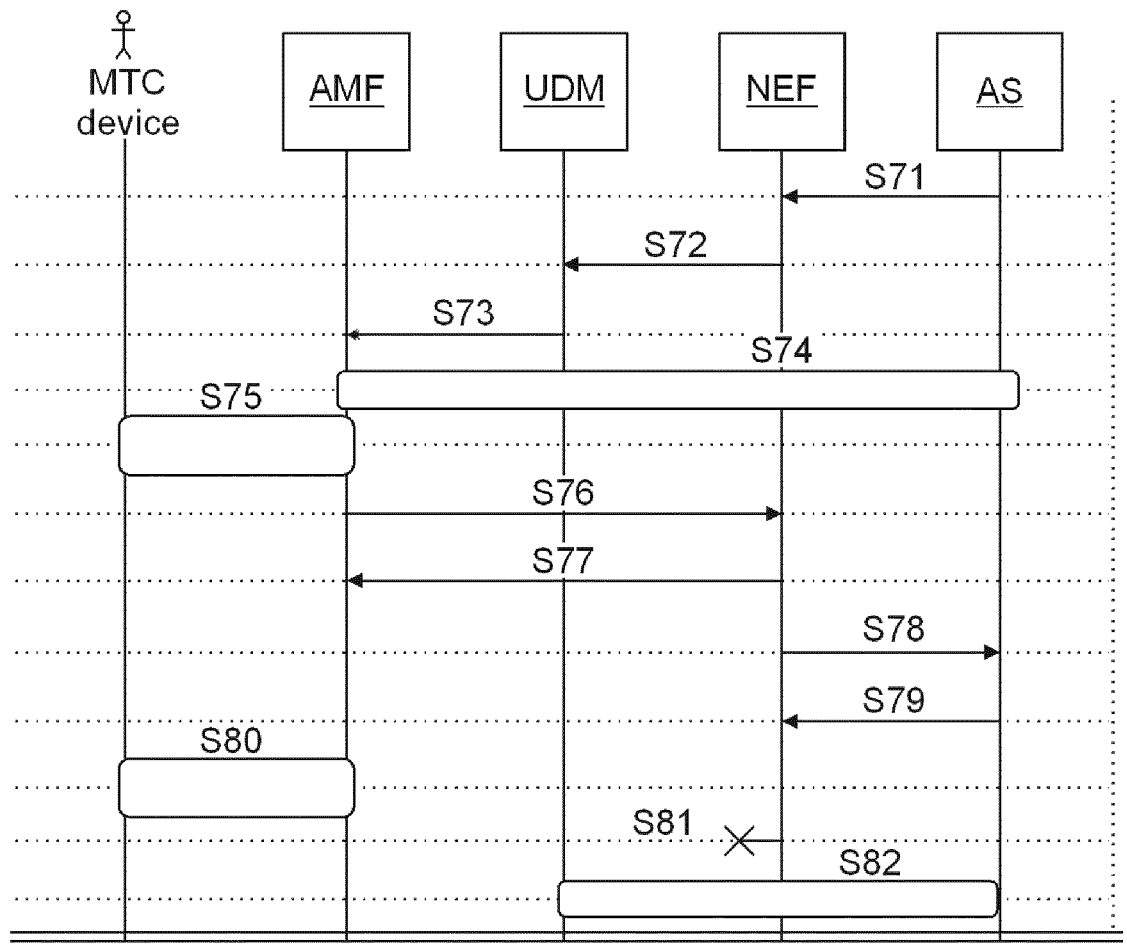
FIG. 4 shows a situation similar to the situation shown in FIG. 2 in a 5G network.
Figure 9:
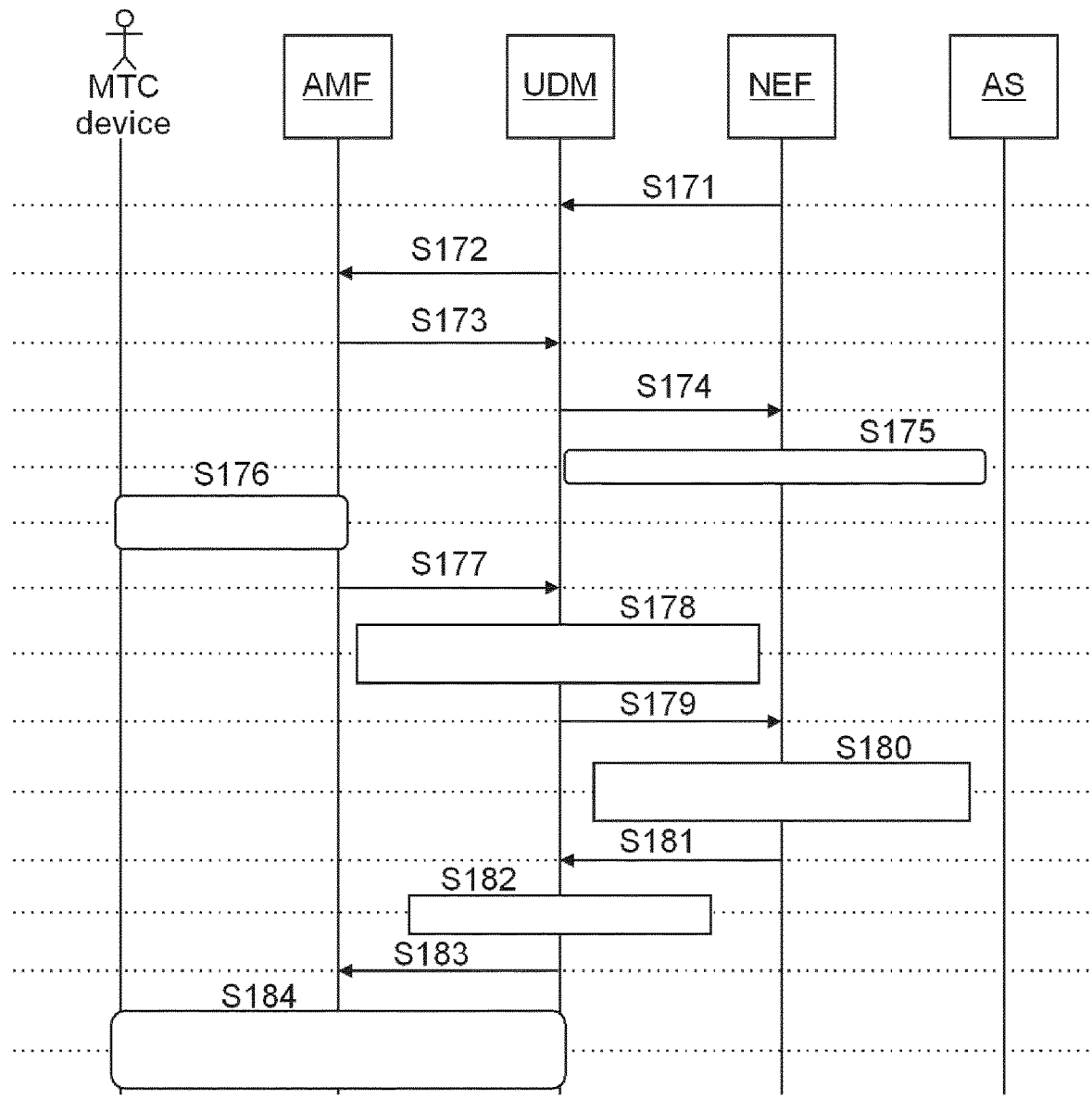
FIG. 9 shows a schematic view of a message exchange in a 5G network between the entities involved in a situation similar to the situation as shown in FIG. 6.

FIG. 9 shows the situation in a 5G network when the failure occurs at the NEF. Steps S171 to S174 correspond to steps S151 to S154. In step S175, the exposure entity fails as discussed above in connection with FIG. 4 in connection with steps S81 and S82. Accordingly, all data is lost including the identity of the application server which requested the monitoring of the event. In step S176, the AMF determines that the event has not occurred for an identified period of time and an audit request is transmitted in step S177 (Nudm_EventExposure_Audit, event-X, audit-request=status_inquiry) to the UDM. In step S178, the requested event is found in the UDM and the UDM audits the event in the network exposure function by transmitting the audit request with a status_inquiry in step S179 (Nnef_EventExposure_Audit, event-X, audit-request=status_inquiry). In step S180, the event is not found in the NEF so that a response is transmitted in step S181 (Nnef_EventExposure_AuditResponse, event-X, audit-result=removed) requesting to remove the event. In step S182, the event is removed from the UDM and the AMF is informed accordingly in step S183 (Nudm_EventExposure_AuditResponse, event-X, audit-result=removed) so that in step S184 the event is removed and the network is consistent with the resources being released in the AMF and the UDM.

Figure 10:
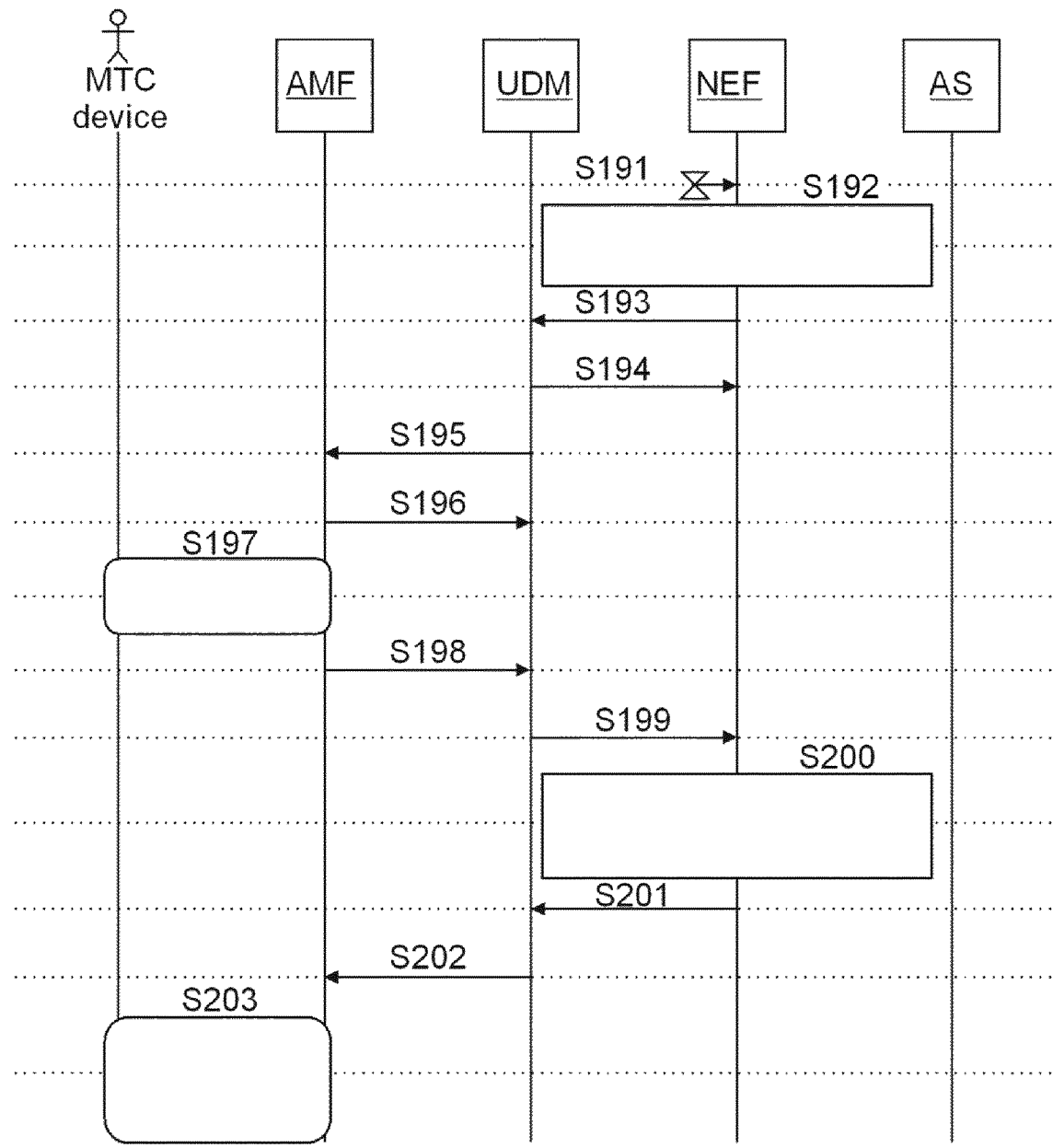
FIG. 10 shows a schematic view of a message exchange between the entities involved in a 5G network where the monitoring of all events is initiated.

In connection with FIG. 10, a situation similar to the one shown in connection with FIG. 7 is shown for a 5G network. In step S191, the network exposure function, NEF recovers from a failure and in step S192 the NEF desires to check longer lasting events such as events with no activity in the last 24 hours after the recovery of step S191. In step S193 (Nudm_EventExposure_Audit, audit-request=status_inquiry_ALL_events,dormant_duration=24 hours), the UDM is asked to carry out the audit for all events which are dormant for more than a defined time period. In step S194 (Nudm_EventExposure_AuditResponse, audit-result=status_inquiry_started), the response is sent to the NEF. In step 195 (Namf_EventExposure_Audit, audit-request=status_inquiry_ALL_events,dormant_duration=24 hours), the UDM sends the audit request to the AMF with the response being sent back in step S196 (Namf_EventExposure_AuditResponse, audit-results=status_inquiry_started). In step S197, the AMF checks all events which are dormant for more than the defined time period. In step S198 (Nudm_EventExposure_Audit, event-X,audit-request=status_inquiry), the result of the audit of one event is transmitted to the UDM which transmits in step S199 (Nnef_EventExposure_Audit, event-X, audit-request=status_inquiry) the information to the NEF. In step 200, if the event is found in the NEF, it replies with a successful answer. Otherwise, if the event does not exist in the NEF, it informs the UDM that the event should be removed. This is shown in step S201 (Nnef_EventExposure_AuditResponse, event=X, audit-resutl=removed), based on the assumption that the event does not exist in the NEF. This information is forwarded in step S202 (Nudm_EventExposure_AuditResponse, audit-result=removed) to the AMF and in step S203 the monitoring for this event is ended and the results are released in the UDM and AMF.

As far as the diameter protocol in the 4G cases is concerned, the following is noted:
a) A new IE (Information Element, in the form of an AVP) may be provided in s6a/s6t to indicate the desired audit time
b) A new IE (in the form of an AVP) may be provided in s6a/s6t to indicate the accepted audit time (value not higher than the desired audit time)
c) A new IE (in the form of an AVP) may be provided in s6a/s6t to indicate the audit action (e.g. status_inquiry, status_inquiry_ALL_events, remove_event)
d) A new IE (in the form of an AVP) may be provided in s6a/s6t to indicate the audit result (e.g. event_removed, event_active)

As far as a serviced base interface protocol is concerned for the 5G network, a service operation network may be required for the audit, namely in more detail a new service operation is required for the Namf_EventExposure, Nnf_EventExposure, Nudm_EventExposure services (e.g. audit) or an existing service operation can be reused (e.g. notify).

Figure 11:
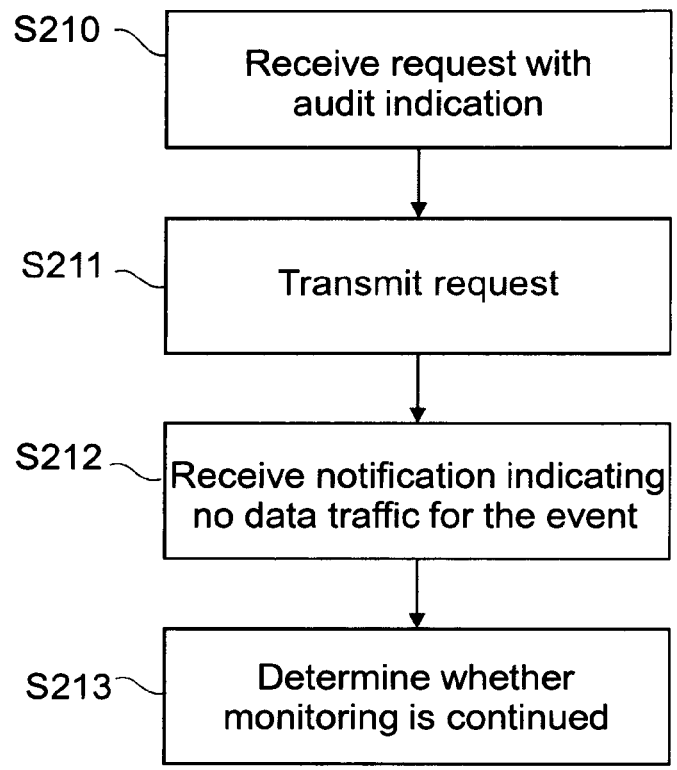
FIG. 11 shows a schematic view of a flow chart comprising the steps carried out at a tracking entity with the use of the audit mechanism.

FIG. 11 summarizes some of the main steps carried out at the tracking entity, such as the HSS or UDM 100. In step S210, the tracking entity, which tracks to which MME the mobile device is connected, receives the request with the indication for an audit as discussed above in connection with FIG. 5, step S91, S111 of FIG. 6, S151 of FIG. 8 or S171 of FIG. 9. In step S211, the received request is transmitted to the MME or AMF including the indication for the audit and the indicated period of time. In step S212, the tracking entity then receives a notification from the MME that the event has not been detected for the indicated period of time and in step S213 it is determined based on information whether the monitoring should be continued or not.

Figure 12:
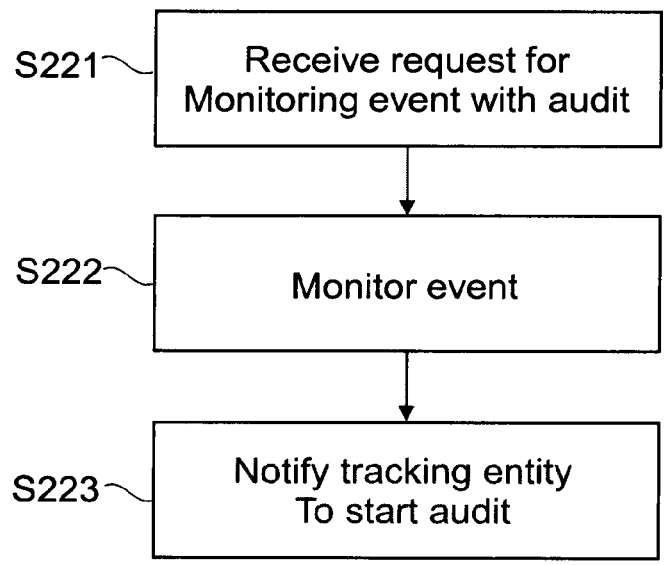
FIG. 12 shows a schematic view of a flowchart comprising the steps carried out at an access and connectivity management entity in the monitoring of an event with an audit mechanism.

In connection with FIG. 12, some of the main steps carried out at the access and connectivity management entity such as the MME or AMF are discussed in more detail. In step S221 the request is received to monitor the event at the mobile device as discussed above in connection with step S92, S112, S152 or S172. The monitoring whether the event occurs is carried out in step S222 for the mobile device and it is determined that the event has not occurred during the indicated period of time, so that in step S223 a notification is transmitted to the tracking entity to start the audit. The notification indicates that the event has not been detected and that the audit should be started in the other entities.

Figure 13:
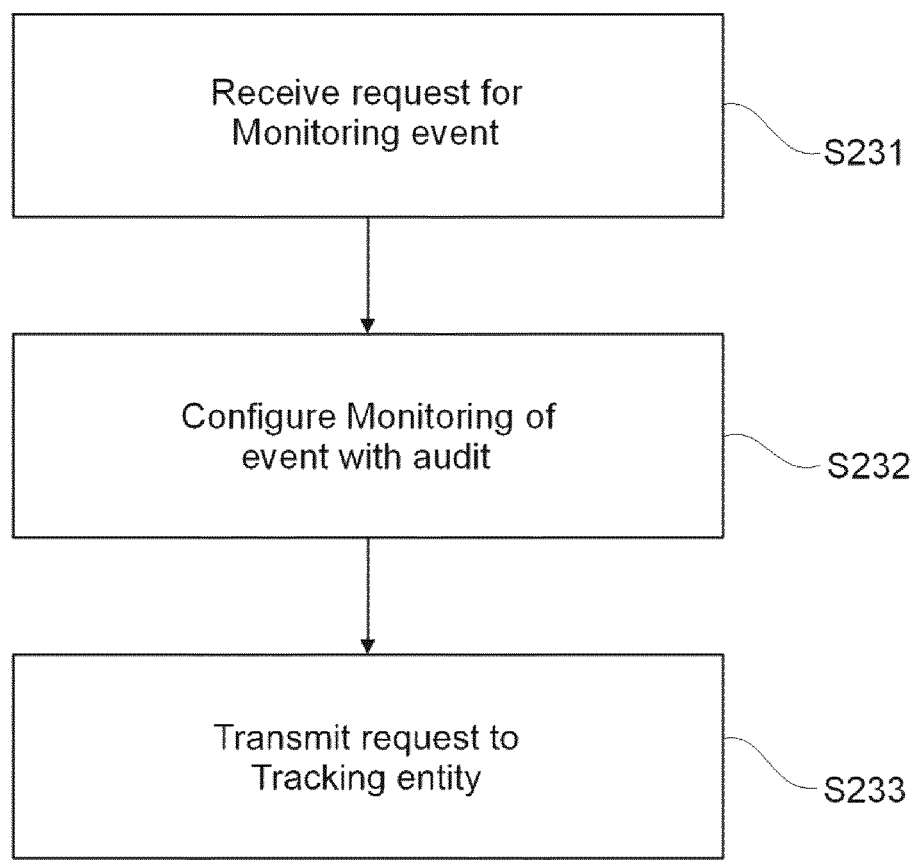
FIG. 13 shows a schematic view of a flowchart comprising the steps carried out at an exposure entity in the monitoring of the events with to use of the audit mechanism.

FIG. 13 shows some of the main steps carried out at the exposure entity such as the SCEF or the NEF discussed above. In step S231, the request is received from the application server to monitor the event and in step S232, the monitoring of the event is configured in the network with the audit for the monitoring by which the validity of the monitoring should be checked when the event has not occurred for the period of time. In step S233, a request is transmitted to the tracking entity wherein the request comprises the indication for the audit and the indicated period of time.

Figure 14:
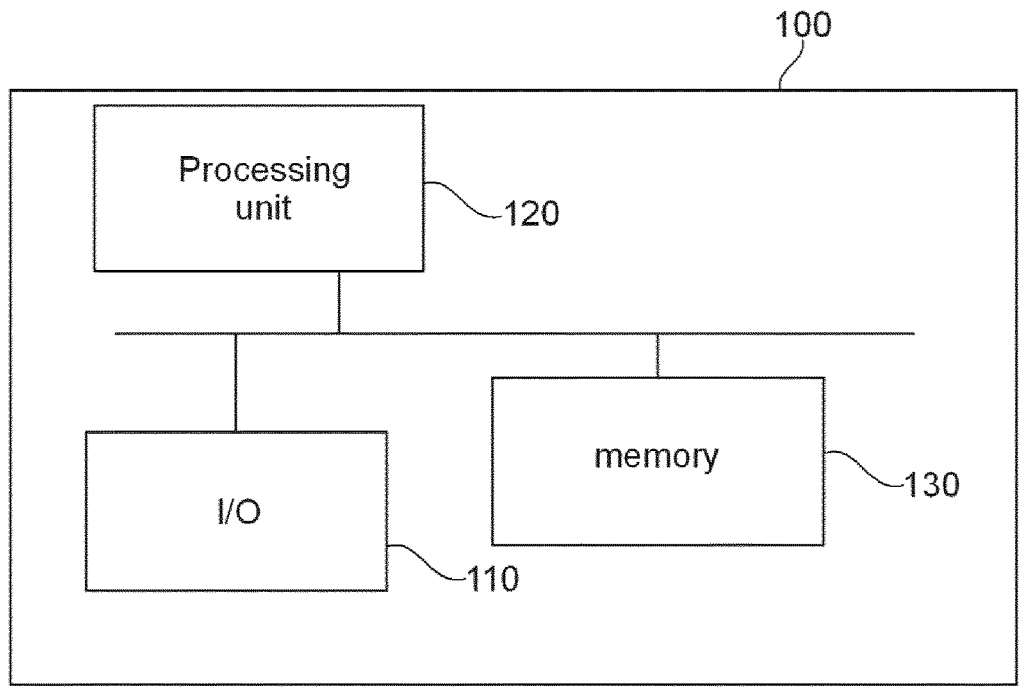
FIG. 14 is a schematic architectural view of a tracking entity configured to control the monitoring of the event in case of an audit mechanism.

FIG. 14 shows a schematic architectural view of the tracking entity which can carry out the above discussed steps in which the tracking entity 100 is involved. The entity 100 comprises an interface or input/output which is provided for transmitting user data or control messages to other entities as discussed above or configured to receive user data or control messages from other entities as mentioned above. The interface can receive the request for the monitoring of the event with the audit and can transmit the received request to the MME. The entity 100 furthermore comprises a processing unit 120 which is responsible for the operation of the tracking entity 100. The processing unit 120 comprises one or more processors and can carry out instructions stored on a memory 130, wherein the memory may include a read-only memory, a random-access memory, a mass-storage, a hard disk or the like. The memory can include a suitable program code to be executed by the processing unit 120 so as to implement the above described functionalities in which the tracking entity is involved.

Figure 15:
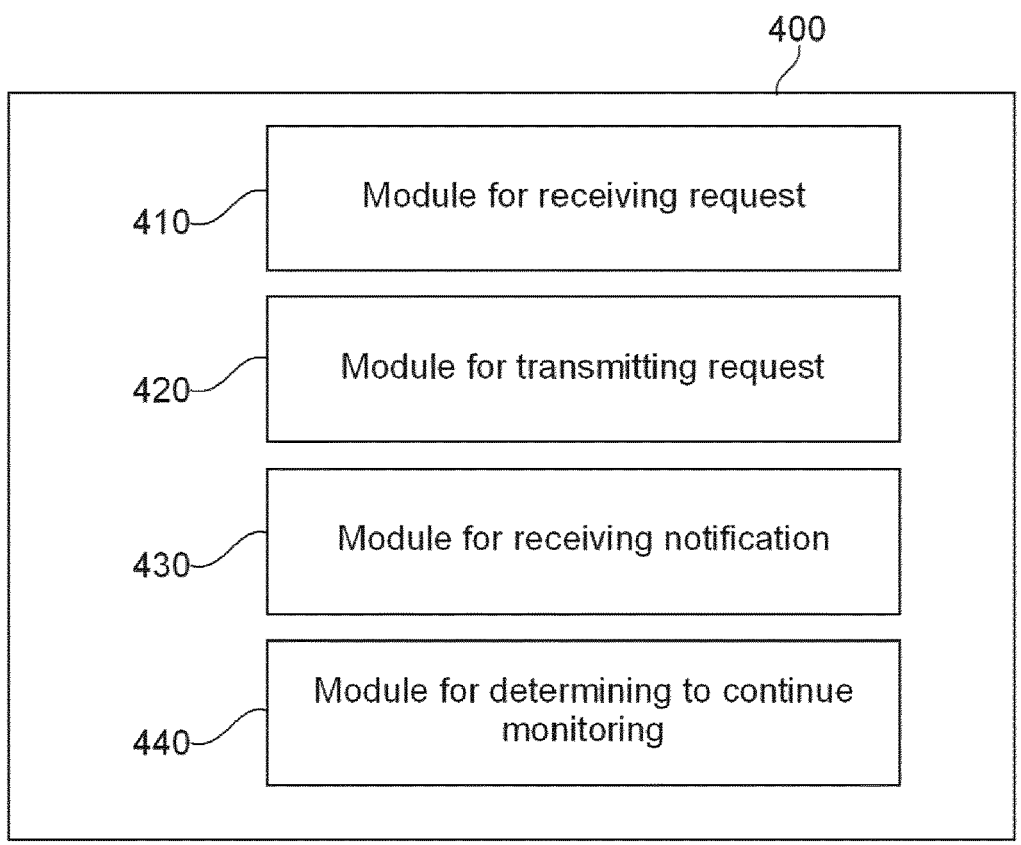
FIG. 15 shows another example schematic representation of a tracking entity configured to monitor an event with an audit mechanism.

FIG. 15 shows another schematic architectural view of a tracking entity (400) comprising a first module (410) configured to receive the request to monitor the event with the indication for the audit. The entity 400 comprises a second module 420 configured to transmit the received request to the MME including the indication for the audit. A module 430 is provided which is configured to receive the notification from the MME that the event has not been detected for the indicated period of time and a module 440 is provided, configured to determine based on information provided in the tracking unit 400 whether the monitoring of the event should be continued or not.

Figure 16:
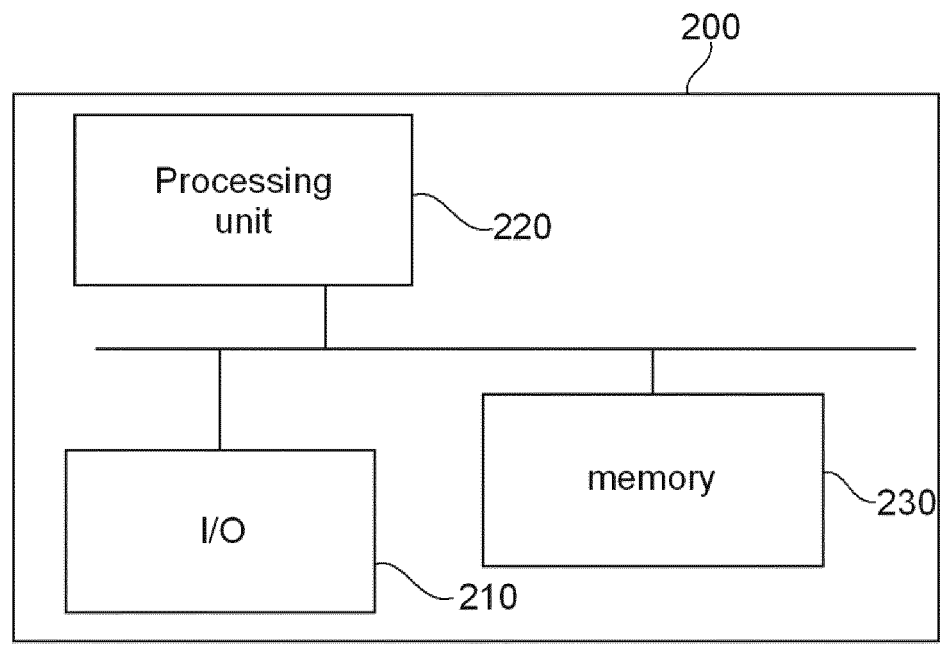
FIG. 16 shows a schematic architectural view of an access and connectivity management entity configured to monitor an event based on an audit mechanism.

FIG. 16 shows a schematic architectural view of an access and connectivity management entity 200 such as the MME or AMF discussed above. The access and connectivity management entity 200 comprises an interface or input/output 210 which is configured to transmit user data or control messages and which is configured to receive user data or control messages. The entity 200 furthermore comprises a processing unit 220 which is responsible for the operation of the access and connectivity management entity.

The processing unit 220 comprises one or more processors and can carry out instructions stored on a memory 230, wherein the memory may include a read-only memory, a random-access memory, a mass-storage, a hard disk or the like. The memory furthermore includes suitable program code to be executed by the processing unit 220 so as to implement the above described functionalities in which the entity 200 is involved.

Figure 17:
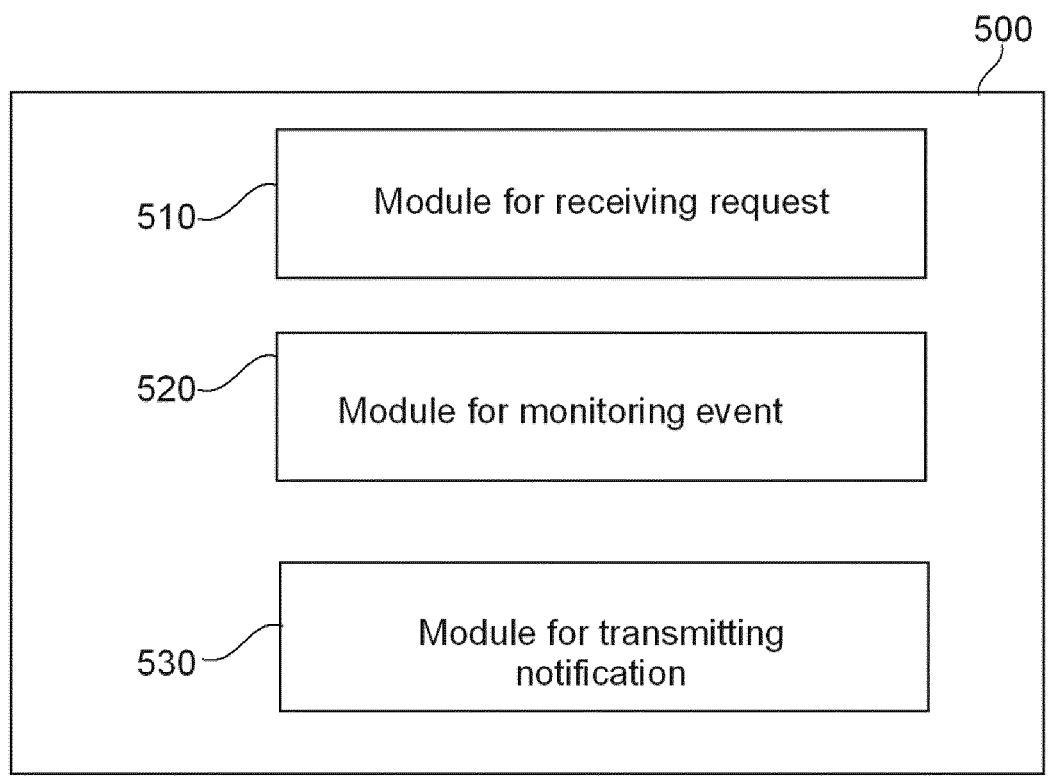
FIG. 17 shows another example schematic representation of the access and connectivity management entity configured to monitor an event with an audit mechanism.

FIG. 17 shows another schematic architectural view of the access and connectivity management entity 500 which is configured to monitor the access and connectivity of the mobile device wherein the entity 500 comprises a first module 510 configured to receive the request to monitor the event including the indication for the audit. Module 520 is provided configured to monitor the event at the mobile device. Module 530 is provided for transmitting the notification to the tracking entity which indicates that the event has not been detected during the indicated period of time and that the audit should be started in the other entities.

Figure 18:
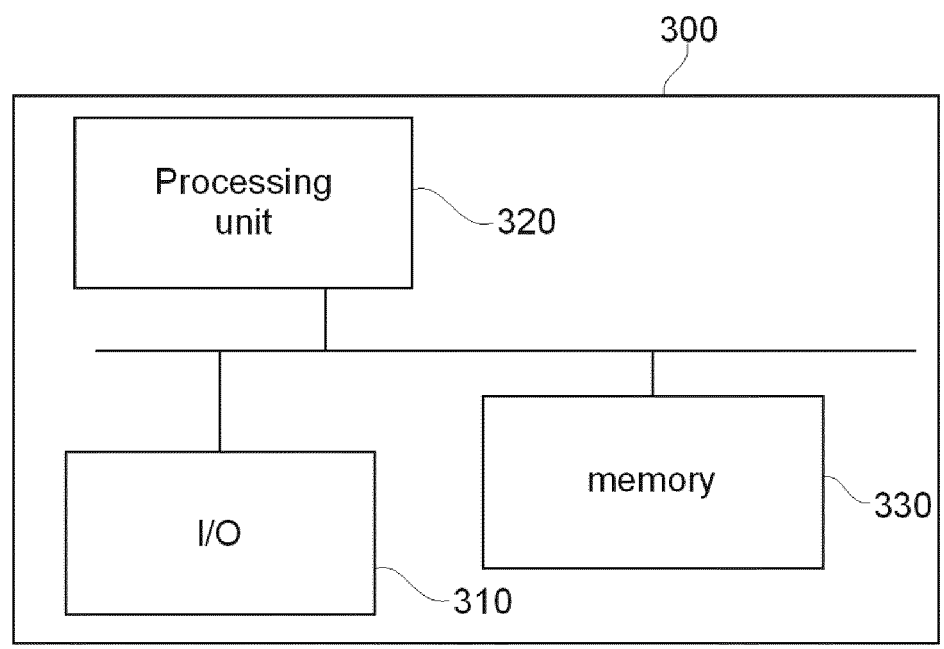
FIG. 18 shows an example schematic architectural view of an exposure entity configured to use the monitoring of the event with an audit mechanism.

FIG. 18 shows a schematic architectural view of the exposure entity configured to expose the services provided through the mobile communications network wherein the exposure entity comprises an input/output or interface 310 configured to transmit user data or control messages and configured to receive user data and control messages. The exposure entity 300 furthermore comprises a processing unit 320 which is responsible for the operation of the entity 300. The processing unit 320 comprises one or more processors and can carry out instructions stored on a memory 330, wherein the memory may include a read-only memory, a random-access memory, a mass-storage, a hard disk or the like. The memory can furthermore include suitable program code to be executed by the processing unit 320 so as to implement the above described functionalities in which the exposure entity is involved.

Figure 19:
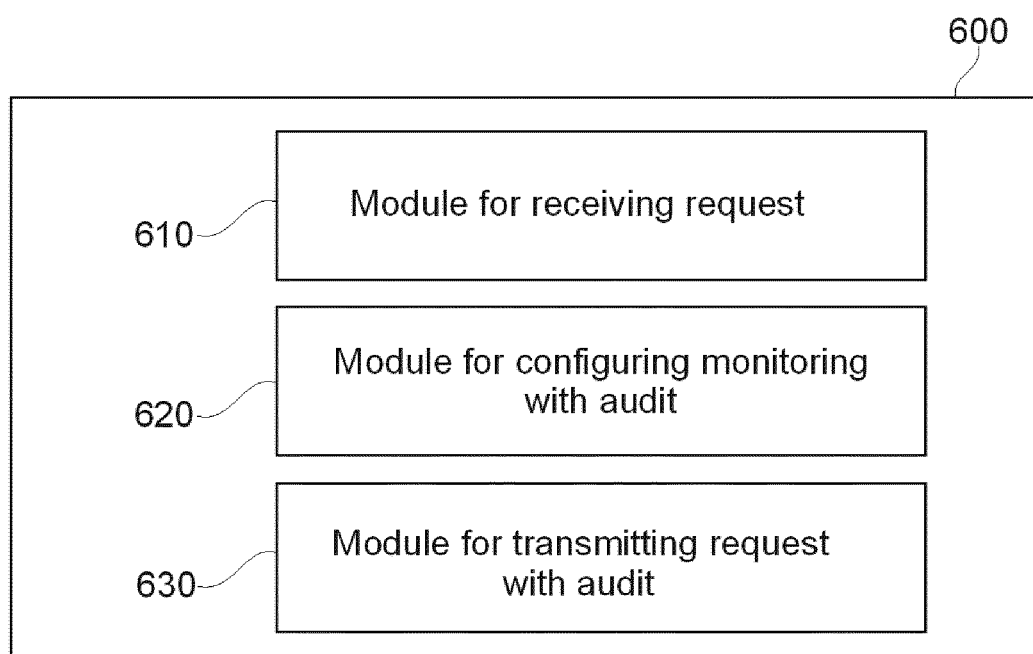
FIG. 19 shows another example schematic architectural view of an exposure entity configured to monitor events with an audit mechanism.

FIG. 19 shows another schematic architectural view of the exposure entity comprising a first module 610, configured to receive the request for the monitoring of the event, a second module 620 is provided, configured to implement the monitoring with the audit as discussed above. A third module 630 is provided configured to transmit a request to monitor the event with the indication for the audit to the MME.

As far as the event is concerned, different options exist. One example of an event is a reachability of a UE. By way of example, IMSI_1 is configured an event (e.g. UE reachability status) by SCEF_1. In this case, SCEF_1 creates a Reference-Id to uniquely identify such event in SCEF_1. This makes the event unique in the whole network, since by concatenating SCEF_1 with Reference-Id, the result is unique.
IMSI_1=214031111111111
SCEF-Reference-Id=123456789
Event type=USE reachability
In HSS/UDM and AMF/MME, the event will be audited by simply indicating SCEF_1:123456789
In another example the event is the location status of the UE: where IMSI_2 is configured an event (e.g. UE location status) by SCEF_2. In this case, SCEF_2 creates a Reference-Id to uniquely identify such event in SCEF_2. This makes the event unique in the whole network, since by concatenating SCEF_2 with Reference-Id, the result is unique.
IMSI_2=214032222222222
Reference-Id=987654321
Event type=UE location status In HSS/UDM and AMF/MME, the event will be audited by simply indicating SCEF_2: 987654321

From the above said, some general conclusions can be drawn:

As far as the tracking entity is concerned, the tracking entity determines in response to the received notification from the access and connectivity management entity, that the event has not been detected for the indicated period of time, and the tracking entity determines whether the monitoring of the event should be continued or not. This can be achieved by the tracking entity in combination with the exposure entity (e.g. NEF). If NEF does not have the event, then the tracking entity removes the event also in the access and connectivity entity. In short: the determination is based on local checks and also on external checks (in NEF).

When the information available in the tracking unit indicates that the monitoring of the event should not be continued, a notification response may be transmitted to the access and connectivity management entity indicating that the monitoring of the event should be removed.

Furthermore, it is possible to inform the exposure entity configured to expose the services provided in the mobile communications network, that the monitoring of the event has been removed in response to the audit.

Furthermore, it is possible that the information available in the tracking entity indicates that the monitoring of the event should be continued. If this is the case, a report request is transmitted to the exposure entity in which it is requested whether the monitoring of the event should be continued or not.

Here it is possible to receive a response to the report request from the exposure entity in which it is indicated that the monitoring of the event should not be continued. The information available in the tracking unit may then be amended accordingly, such that the monitoring of the event is not continued.

When it is determined, based on the information available in the tracking unit, that the monitoring of the event should not be continued, the resources for the monitoring of the event may be released.

Furthermore, the tracking unit may determine that the audit for all events to be monitored should be carried out for all events for which the corresponding event has not been detected for the indicated period of time (e.g. based on an operator's request e.g. a manual command or request can be initiated in the NEF or the UDM to initiate this polling of dormant events). The tracking entity then transmits a request to a plurality of access and connectivity management entities, requesting each of the access and connectivity management entities to start the audit for the monitoring of all events for which the corresponding event has not been detected for the indicated period of time. Furthermore, a modification may be received from at least one of the plurality of access and connectivity management entities wherein the notification indicates that one of the corresponding events has not been detected. The exposure entity is then asked, whether the event should still be monitored in view of the fact, that said one of the corresponding events has not been detected.

The step of determining that the audit for all events should be carried out can be based on a request received from the exposure entity configured to expose the services provided by the mobile communications network by which the tracking entity is requested that the audit for all events should be carried out. As an alternative, the step of determining that the audit for all events should be carried out, may also be triggered based on a predefined trigger event provided in the tracking unit (e.g. a prioritized event set by an operator of the mobile communications network).

As far as the operation of the access and connectivity management entity 200 such as the MME or AMF is concerned, the access and connectivity management entity transmits a notification to the tracking entity 100 indicating that the audit should be started. The access and connectivity management entity 200 may receive a response to the notification wherein this response indicates that the monitoring of the event should not be continued, so that the monitoring of the event is removed in reaction to the received response and the resources used for the monitoring of the event are released.

As far as the exposure entity 300 is concerned, the exposure entity may receive a report from the tracking entity indicating that the monitoring of the event at the tracking entity has been removed in response to the audit. The exposure entity can furthermore check, whether the monitoring of the event is active in the exposure entity and when the monitoring of the event is active, the monitoring of the event can be stopped and at least one of the tracking entity and the application servers can be informed about the stopping of the monitoring.

The exposure entity may furthermore receive a request for the tracking entity to check whether the monitoring of the event is active in the exposure entity. The exposure entity can check whether the monitoring of the event is active in the exposure entity and when the monitoring is not active in the exposure entity, a response is transmitted to the tracking entity, asking the tracking entity to remove the monitoring of the event at the tracking entity.

Furthermore, the exposure entity may determine that an audit should be carried out for all events to be monitored for which the corresponding event has not been detected within the indicated period of time. Furthermore, a request is forwarded to the tracking entity to audit all events to be monitored for which the corresponding event has not been detected for the indicated period of time. A response may be received to the request from the tracking entity indicating that the monitoring of one event is active for which the event has not been detected within the indicated period of time and it is checked, whether the event is found in the exposure entity. When the event is not found, the tracking entity is requested to remove the monitoring of the event.

The fact, that the audit should be carried out for all events, may be due to a request that the audit should be carried out, e.g. a request from the operator as discussed in connection with FIG. 7. Furthermore, it is possible that it is determined that the audit should be carried out based on a predefined trigger event provided in the exposure entity which starts the auditing of all events when the trigger event occurs (e.g. also set by the operator).

The above described application offers a mechanism to ensure the consistency of ongoing monitoring of events across the different 4G or 5G function entities or network functions, especially for long-lasting monitoring events for devices with a long battery life-time, a low mobility and a low activity.

The invention claimed is:

1. A method for operating a tracking entity configured to track to which access and connectivity management entity a mobile device is connected in a mobile communications network, wherein an application server is initiating a monitoring of an event occurring at the mobile device, the method performed by the tracking entity comprising:

receiving a request to monitor the event at the mobile device, the request comprising an indication for an audit for the monitoring of the event by which a validity of the monitoring of the event should be checked when the event has not been detected for an indicated period of time,
transmitting the received request for the event with the indication for the audit and the indicated period of time to the access and connectivity management entity to which the mobile device is connected,
receiving a notification from the access and connectivity management entity that the event has not been detected for the indicated period of time, and
determining, in response to the received notification, based on information available in the tracking entity whether the monitoring of the event should be continued or not.

2. The method according to claim 1, wherein when the information available in the tracking unit indicates that the monitoring of the event should not be continued a notification response is transmitted to the access and connectivity management entity indicating that the monitoring of the event should be removed.

3. The method according to claim 2, further informing an exposure entity configured to expose services provided by the mobile communications network that the monitoring of the event has been removed in response to the audit.

4. The method according to claim 1, when the information available in the tracking entity indicates that the monitoring of the event should be continued, a report request is transmitted to an exposure entity configured to expose services provided by the mobile communications network requesting whether the monitoring of the event should be continued or not.

5. The method according to claim 4, further receiving a response to the report request from the exposure entity indicating that the monitoring of the event should not be continued, wherein the information available in the tracking entity is amended such that the monitoring of the event is not continued.

6. The method according to claim 1, wherein when it is determined based on the information available in the tracking unit, that the monitoring of the event should not be continued, resources used for the monitoring of the event are released.

7. The method according to claim 1, further comprising:
determining that the audit for all events to be monitored for which the corresponding event has not been detected within the indicated period of time should be carried out,
transmitting a request to a plurality of access and connectivity management entities, requesting each access and connectivity management entity to start the audit for the monitoring of all events for which the corresponding event has not been detected for the indicated period of time, and
receiving the notification from at least one of the plurality of access and connectivity management entities indicating that one of the corresponding events has not been detected, wherein the exposure entity is asked whether the event should still be monitored in view of the fact that said one of the corresponding events has not been detected.

8. The method according to claim 7, wherein determining that the audit for all events should be carried out comprises receiving a request from an exposure entity configured to expose services provided by the mobile communications network requesting that the audit for all events should be carried out.

9. The method according to claim 7, wherein the determining that the audit for all events should be carried out is triggered based on a predefined trigger event provided in the tracking entity.

10. A method for operating an access and connectivity management entity configured to monitor the access and connectivity of a mobile device to a mobile communications network, the method performed by the access and connectivity management entity comprising:
receiving a request to monitor an event at the mobile device initiated by an application server, the request comprising an indication for an audit for the monitoring of the event by which a validity of monitoring of the event should be checked when the event has not been detected for an indicated period of time,
monitoring whether the event occurs for the mobile device, and
wherein when it is determined that the event has not occurred during the indicated period of time, a notification is transmitted to a tracking entity configured to track by which access and connectivity management entity the mobile device is connected to a mobile communications network, the notification indicating that the event has not been detected during the indicated period of time, and that the audit should be started in other entities of the mobile communications network involved in the monitoring of the event.

11. The method according to claim 10, further receiving a response to the notification, the response indicating that the monitoring of the event should not be continued, wherein the monitoring of the event is removed in reaction to the received response and resources used for the monitoring of the event are released.

12. A tracking entity configured to track to which access and connectivity management entity a mobile device is connected in a mobile communications network, wherein an application server is initiating a monitoring of an event occurring at the mobile device, the tracking entity comprising a memory and at least one processing unit, the memory containing instructions executable by said at least one processing unit, wherein the tracking entity is operative to:
receive a request to monitor the event at the mobile device, the request comprising an indication for an audit for the monitoring of the event by which a validity of the monitoring of the event should be checked when the event has not been detected for an indicated period of time,
transmit the received request for the event with the indication for the audit and the indicated period of time to the access and connectivity management entity to which the mobile device is connected,
receive a notification from the access and connectivity management entity that the event has not been detected for the indicated period of time, and
determine, in response to the received notification, based on information available in the tracking entity whether the monitoring of the event should be continued or not.

13. The tracking entity according to claim 12, further being operative, when the information available in the tracking unit indicates that the monitoring of the event should not be continued, to transmit a notification response to the access and connectivity management entity indicating that the monitoring of the event should be removed.

14. The tracking entity according to claim 13, further being operative to inform an exposure entity configured to expose services provided by the mobile communications network that the monitoring of the event has been removed in response to the audit.

15. The tracking entity according to claim 12, further being operative, when the information available in the tracking entity indicates that the monitoring of the event should be continued, to transmit a report request to an exposure entity configured to expose services provided by the mobile communications network requesting whether the monitoring of the event should be continued or not.

16. The tracking entity according to claim 15, further being operative to receive a response to the report request from the exposure entity indicating that the monitoring of the event should not be continued, and to amend the information available in the tracking entity such that the monitoring of the event is not continued.

17. The tracking unit according to claim 12, further being operative, when it is determined based on the information available in the tracking unit, that the monitoring of the event should not be continued, to release resources used for the monitoring of the event.

18. The tracking unit according to claim 12, further being operative to
   determine that the audit for all events to be monitored for which the corresponding event has not been detected within the indicated period of time should be carried out,
   transmit a request to a plurality of access and connectivity management entities, requesting each access and connectivity management entity to start the audit for the monitoring of all events for which the corresponding event has not been detected for the indicated period of time, and
   receive the notification from at least one of the plurality of access and connectivity management entities indicating that one of the corresponding events has not been detected, and to ask the exposure entity whether the event should still be monitored in view of the fact that said one of the corresponding events has not been detected.

19. The tracking entity according to claim 18, further being operative, for determining that the audit for all events should be carried out, to receive a request from an exposure entity configured to expose services provided by the mobile communications network requesting that the audit for all events should be carried out.

20. The tracking entity according to claim 18, further being operative, for determining that the audit for all events should be carried out, to trigger the starting of the audit for all events based on a predefined trigger event provided in the tracking unit.

21. An access and connectivity management entity configured to monitor the access and connectivity of a mobile device to a mobile communications network, the access and connectivity management entity comprising a memory and at least one processing unit, the memory containing instructions executable by said at least one processing unit, wherein the access and connectivity management entity is operative to:
   receive a request to monitor an event at the mobile device initiated by an application server, the request comprising an indication for an audit for the monitoring of the event by which a validity of monitoring of the event should be checked when the event has not been detected for an indicated period of time,
   monitor whether the event occurs for the mobile device, and
   wherein when it is determined that the event has not occurred during the indicated period of time, the access and connectivity management entity is operative to transmit a notification to a tracking entity configured to track by which access and connectivity management entity the mobile device is connected to a mobile communications network, the notification indicating that the event has not been detected during the indicated period of time, and that the audit should be started in other entities of the mobile communications network involved in the monitoring of the event.

22. The access and connectivity management entity according to claim 21, further being operative to receive a response to the notification, the response indicating that the monitoring of the event should not be continued, and to remove the monitoring of the event in reaction to the received response, and to release resources used for the monitoring of the event.

23. An exposure entity configured to expose services provided by the mobile communications network, the exposure entity comprising a memory and at least one processing unit, the memory containing instructions executable by said at least one processing unit, wherein the exposure entity is operative to:
   receive a request from an application server to monitor an event at a mobile device connected to the mobile communications network,
   configure the monitoring of the event in the mobile communications network, the configuring comprising configuring an audit for the monitoring of the event by which a validity of the monitoring of the event should be checked when the event has not been detected for an indicated period of time, and
   transmit a request to monitor the event to a tracking entity configured to track to which access and connectivity management entity the mobile device is connected to the mobile communications network, the request comprising the indication for the audit and the indicated period of time.

24. The exposure entity according to claim 23, further being operative to:
   receive a report from the tracking entity indicating that the monitoring of the event at the tracking entity has been removed in response to the audit, and
   check whether the monitoring of the event is active in the exposure entity, wherein when the monitoring of the event is active, and to stop the monitoring of the event and to inform at least one of the tracking entity and the application server about the stopping of the monitoring of the event.

25. The exposure entity according to claim 23, further being operative to:
   receive a request from the tracking entity to check whether the monitoring of the event is active in the exposure entity,
   check whether the monitoring of the event is active in the exposure entity, wherein when the monitoring of the event is not active in the exposure entity, and
   transmit a response to the tracking entity asking the tracking entity to remove the monitoring of the event at the tracking entity.

26. The exposure entity according to claim 23, further being operative to
- determine that the audit should be carried out for all events to be monitored for which the corresponding event has not been detected within the indicated period of time,
- forward a request to the tracking entity to audit all events to be monitored for which the corresponding event has not been detected with the indicated period of time,
- receive a response to the request from the tracking entity indicating that the monitoring of one event is active for which the event has not been detected within the indicated period of time, and
- check whether the event is found in the exposure entity, wherein when the event is not found, to request the tracking entity to remove the monitoring of the event.

27. The exposure entity according to claim 26, further being operative, for determining that the audit should be carried out for all events, to receive a request requesting that the audit should be carried out for all events.

28. The exposure entity according to claim 26, further being operative, for determining that the audit should be carried out for all events, to trigger the starting of the audit for all events based on a predefined trigger event provided in the exposure entity.

* * * * *

UNITED STATES PATENT AND TRADEMARK OFFICE
CERTIFICATE OF CORRECTION

| | |
|---|---|
| PATENT NO. | : 11,889,328 B2 |
| APPLICATION NO. | : 17/274501 |
| DATED | : January 30, 2024 |
| INVENTOR(S) | : Merino Vazquez et al. |

It is certified that error appears in the above-identified patent and that said Letters Patent is hereby corrected as shown below:

In the Specification

In Column 1, Line 53, delete "25.50223.502" and insert -- 23.502 --, therefor.

In Column 9, Line 13, delete "data base," and insert -- database, --, therefor.

In Column 9, Line 41, delete "send" and insert -- sent --, therefor.

In Column 11, Line 36, delete "send" and insert -- sent --, therefor.

Signed and Sealed this
Twenty-third Day of April, 2024

Katherine Kelly Vidal
*Director of the United States Patent and Trademark Office*